(12) United States Patent
Owens et al.

(10) Patent No.: US 10,895,762 B2
(45) Date of Patent: Jan. 19, 2021

(54) MULTI-COIL FIELD GENERATION IN AN ELECTRONIC CONTACT LENS SYSTEM

(71) Applicant: Spy Eye, LLC, Los Gatos, CA (US)

(72) Inventors: Thomas Llewellyn Owens, Saratoga, CA (US); Hawk Yin Pang, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 225 days.

(21) Appl. No.: 15/966,481

(22) Filed: Apr. 30, 2018

(65) Prior Publication Data

US 2019/0331938 A1 Oct. 31, 2019

(51) Int. Cl.
*G02C 11/00* (2006.01)
*G02C 7/04* (2006.01)
*H01F 38/14* (2006.01)
*H02J 50/10* (2016.01)
*H02J 50/40* (2016.01)

(52) U.S. Cl.
CPC ........... *G02C 11/10* (2013.01); *G02C 7/04* (2013.01); *H01F 38/14* (2013.01); *H02J 50/10* (2016.02); *H02J 50/40* (2016.02)

(58) Field of Classification Search
CPC ........... H02J 50/10; H02J 50/12; G02C 11/10; G02C 7/04; H01F 38/14
USPC ....................................................... 307/104
See application file for complete search history.

(56) References Cited

U.S. PATENT DOCUMENTS

| 4,014,321 A | 3/1977 | March |
| 4,577,545 A | 3/1986 | Kemeny |
| 4,871,247 A | 10/1989 | Haynes |

(Continued)

FOREIGN PATENT DOCUMENTS

| CA | 2280022 | 1/2001 |
| WO | WO 2016/014118 | 1/2016 |

(Continued)

OTHER PUBLICATIONS

Avestruz, A-T. et al., "Single-Sided AC Magnetic Fields for Induction Heating," 39th Annual Conference of the IEEE, Nov. 10-13, 2013, pp. 5052-5057.

(Continued)

*Primary Examiner* — William R Alexander
*Assistant Examiner* — Ephrem Z Mebrahtu
(74) *Attorney, Agent, or Firm* — Fenwick & West LLP

(57) ABSTRACT

An augmented reality system includes an electronic contact lens and a plurality of conductive coils to be worn, for instance, around a neck, around an arm, or on a chest of a user. The conductive coils can inductively couple to the electronic contact lens by producing magnetic fields that the electronic contact lens can convert into power. A direction of the resulting magnetic at the electronic contact lens can rotate over time, enabling the electronic contact lens to periodically form a strong inductive coupling with the plurality of conductive coils despite the orientation of the electronic contact lens. The electronic contact lens can also output a feedback signal representative of the power produced at the electronic contact lens or an orientation signal representative of the orientation of the eye, and the magnetic fields produced by the conductive coils can be altered based on the feedback signal or orientation signal.

20 Claims, 18 Drawing Sheets

(56) References Cited

U.S. PATENT DOCUMENTS

| | | |
|---|---|---|
| 4,941,068 A | 7/1990 | Hofmann |
| 5,331,149 A | 7/1994 | Spitzer et al. |
| 5,467,104 A | 11/1995 | Furness et al. |
| 5,638,218 A | 6/1997 | Oomura |
| 5,638,219 A | 6/1997 | Medina et al. |
| 5,682,210 A | 10/1997 | Weirich |
| 5,699,193 A | 12/1997 | Monno et al. |
| 5,712,721 A | 1/1998 | Large |
| 5,726,916 A | 3/1998 | Smyth |
| 6,120,460 A | 9/2000 | Abreu |
| 6,181,287 B1 | 1/2001 | Beigel |
| 6,215,593 B1 | 4/2001 | Bruce |
| 6,307,945 B1 | 10/2001 | Hall |
| 6,312,393 B1 | 11/2001 | Abreu |
| 6,509,743 B1 | 1/2003 | Ferrero |
| 6,570,386 B2 | 5/2003 | Goldstein |
| 6,594,370 B1 | 7/2003 | Anderson |
| 6,823,171 B1 | 11/2004 | Kaario |
| 6,851,805 B2 | 2/2005 | Blum et al. |
| 6,920,283 B2 | 7/2005 | Goldstein |
| 7,088,235 B1 | 8/2006 | Carricut |
| 7,137,952 B2 | 11/2006 | Leonardi et al. |
| 7,359,059 B2 | 4/2008 | Lust et al. |
| 7,562,445 B2 | 7/2009 | Lerch |
| 7,626,562 B2 | 12/2009 | Iwasaki |
| 7,758,187 B2 | 7/2010 | Amirparviz |
| 7,835,056 B2 | 11/2010 | Doucet et al. |
| 7,893,832 B2 | 2/2011 | Laackmann |
| 7,931,832 B2 | 4/2011 | Pugh |
| 8,077,245 B2 | 12/2011 | Adamo et al. |
| 8,087,777 B2 | 1/2012 | Rosenthal |
| 8,096,654 B2 | 1/2012 | Amirparviz et al. |
| 8,348,422 B2 | 1/2013 | Pugh et al. |
| 8,348,424 B2 | 1/2013 | Pugh et al. |
| 8,394,660 B2 | 3/2013 | Kim et al. |
| 8,398,239 B2 | 3/2013 | Horning et al. |
| 8,430,310 B1 | 4/2013 | Ho et al. |
| 8,441,731 B2 | 5/2013 | Sprague |
| 8,446,341 B2 | 5/2013 | Amirparviz et al. |
| 8,482,858 B2 | 7/2013 | Sprague |
| 8,520,309 B2 | 8/2013 | Sprague |
| 8,526,879 B2 | 9/2013 | Kristiansen et al. |
| 8,579,434 B2 | 11/2013 | Amirparviz et al. |
| 8,582,209 B1 | 11/2013 | Amirparviz |
| 8,608,310 B2 | 12/2013 | Otis et al. |
| 8,632,182 B2 | 1/2014 | Chen et al. |
| 8,721,074 B2 | 5/2014 | Pugh et al. |
| 8,764,185 B1 | 7/2014 | Biederman et al. |
| 8,781,570 B2 | 7/2014 | Chuang et al. |
| 8,786,520 B2 | 7/2014 | Legerton et al. |
| 8,786,675 B2 | 7/2014 | Deering |
| 8,798,332 B2 | 8/2014 | Otis et al. |
| 8,827,445 B1 | 9/2014 | Wiser et al. |
| 8,830,571 B1 | 9/2014 | Vizgaitis |
| 8,870,370 B1 | 10/2014 | Otis et al. |
| 8,874,182 B2 | 10/2014 | Etzkorn et al. |
| 8,906,088 B2 | 12/2014 | Pugh et al. |
| 8,911,078 B2 | 12/2014 | Meyers |
| 8,922,898 B2 | 12/2014 | Legerton et al. |
| 8,926,809 B2 | 1/2015 | Pletcher |
| 8,931,906 B2 | 1/2015 | Huang et al. |
| 8,960,898 B1 | 2/2015 | Etzkorn et al. |
| 8,963,268 B2 | 2/2015 | Kim et al. |
| 8,964,298 B2 | 2/2015 | Haddick et al. |
| 8,971,978 B2 | 3/2015 | Ho et al. |
| 8,985,763 B1 | 3/2015 | Etzkorn et al. |
| 8,989,834 B2 | 3/2015 | Ho et al. |
| 9,000,000 B2 | 4/2015 | Carroll |
| 9,028,068 B2 | 5/2015 | Chang |
| 9,039,171 B2 | 5/2015 | Groisman |
| 9,040,923 B2 | 5/2015 | Sprague et al. |
| 9,047,512 B2 | 6/2015 | Otis et al. |
| 9,048,389 B2 | 6/2015 | Fu et al. |
| 9,052,528 B2 | 6/2015 | Pugh et al. |
| 9,052,533 B2 | 6/2015 | Pugh et al. |
| 9,054,079 B2 | 6/2015 | Etzkorn |
| 9,058,053 B2 | 6/2015 | Covington |
| 9,063,351 B1 | 6/2015 | Ho et al. |
| 9,063,352 B2 | 6/2015 | Ford et al. |
| 9,111,473 B1 | 8/2015 | Ho et al. |
| 9,130,099 B2 | 9/2015 | Robin |
| 9,130,122 B2 | 9/2015 | Fu et al. |
| 9,134,546 B2 | 9/2015 | Pugh et al. |
| 9,153,074 B2 | 10/2015 | Zhou et al. |
| 9,158,133 B1 | 10/2015 | Pletcher et al. |
| 9,161,712 B2 | 10/2015 | Etzkorn |
| 9,170,646 B2 | 10/2015 | Toner et al. |
| 9,178,107 B2 | 11/2015 | Tsai et al. |
| 9,192,298 B2 | 11/2015 | Bouwstra et al. |
| 9,195,075 B2 | 11/2015 | Pugh et al. |
| 9,196,094 B2 | 11/2015 | Ur |
| 9,215,293 B2 | 12/2015 | Miller |
| 9,217,881 B2 | 12/2015 | Pugh et al. |
| 9,225,375 B2 | 12/2015 | Pugh et al. |
| 9,244,285 B2 | 1/2016 | Chen et al. |
| 9,271,677 B2 | 3/2016 | Leonardi |
| 9,282,920 B2 | 3/2016 | Ho et al. |
| 9,289,123 B2 | 3/2016 | Weibel et al. |
| 9,289,954 B2 | 3/2016 | Linhardt et al. |
| 9,298,002 B2 | 3/2016 | Border et al. |
| 9,298,020 B1 | 3/2016 | Etzkorn et al. |
| D754,861 S | 4/2016 | O'Driscoll et al. |
| 9,307,905 B2 | 4/2016 | Varel et al. |
| 9,310,626 B2 | 4/2016 | Pugh et al. |
| 9,316,848 B2 | 4/2016 | Pugh et al. |
| 9,326,710 B1 | 5/2016 | Liu et al. |
| 9,332,935 B2 | 5/2016 | Etzkorn et al. |
| 9,335,562 B2 | 5/2016 | Pugh et al. |
| 9,341,843 B2 | 5/2016 | Border et al. |
| 9,366,872 B2 | 6/2016 | Honea et al. |
| 9,366,881 B2 | 6/2016 | Pugh et al. |
| 9,389,433 B2 | 7/2016 | Pugh et al. |
| 9,401,454 B2 | 7/2016 | Robin et al. |
| 9,414,746 B2 | 8/2016 | Bergman et al. |
| 9,425,359 B2 | 8/2016 | Tsai et al. |
| 9,442,307 B2 | 9/2016 | Meyers |
| 9,442,310 B2 | 9/2016 | Biederman et al. |
| 9,445,768 B2 | 9/2016 | Alexander et al. |
| 9,523,865 B2 | 12/2016 | Pletcher et al. |
| 9,629,774 B2 | 4/2017 | Dayal et al. |
| 9,728,981 B2 | 8/2017 | Lee |
| 9,810,926 B2 | 11/2017 | Sako |
| 9,939,658 B1 | 4/2018 | Gutierrez et al. |
| 10,025,118 B1 | 7/2018 | Markus |
| 10,278,644 B1 | 5/2019 | Etzkorn |
| 2002/0084904 A1 | 7/2002 | De La Huerga |
| 2002/0101383 A1 | 8/2002 | Junod |
| 2003/0173408 A1 | 9/2003 | Mosher |
| 2003/0179094 A1 | 9/2003 | Abreu |
| 2004/0027536 A1 | 2/2004 | Blum |
| 2005/0179604 A1 | 8/2005 | Liu |
| 2006/0177086 A1 | 8/2006 | Rye |
| 2006/0290882 A1 | 12/2006 | Meyers et al. |
| 2007/0024423 A1 | 2/2007 | Nikitin |
| 2007/0241986 A1 | 10/2007 | Lee |
| 2008/0165072 A1 | 7/2008 | Schlager |
| 2009/0058189 A1 | 3/2009 | Cook |
| 2009/0066722 A1 | 3/2009 | Kriger et al. |
| 2009/0072628 A1 | 3/2009 | Cook |
| 2009/0244477 A1 | 10/2009 | Pugh |
| 2010/0001926 A1 | 1/2010 | Amirparviz et al. |
| 2010/0110372 A1 | 5/2010 | Pugh |
| 2010/0136905 A1 | 6/2010 | Kristiansen |
| 2010/0234717 A1 | 9/2010 | Wismer et al. |
| 2010/0253476 A1 | 10/2010 | Poutiatine |
| 2010/0308749 A1 | 12/2010 | Liu |
| 2011/0034134 A1 | 2/2011 | Henderson |
| 2011/0221659 A1 | 9/2011 | King et al. |
| 2012/0105226 A1 | 5/2012 | Bourdeau |
| 2012/0262003 A1 | 10/2012 | Tetu |
| 2013/0050432 A1 | 2/2013 | Perez et al. |
| 2013/0100139 A1 | 4/2013 | Schliesser et al. |
| 2013/0242077 A1 | 9/2013 | Lin et al. |
| 2013/0270664 A1 | 10/2013 | Kim et al. |

(56) References Cited

U.S. PATENT DOCUMENTS

| | | |
|---|---|---|
| 2014/0016097 A1 | 1/2014 | Leonardi et al. |
| 2014/0063054 A1 | 3/2014 | Osterhout et al. |
| 2014/0081178 A1 | 3/2014 | Pletcher |
| 2014/0098226 A1 | 4/2014 | Pletcher et al. |
| 2014/0118357 A1 | 5/2014 | Covington |
| 2014/0120983 A1 | 5/2014 | Lam |
| 2014/0192311 A1 | 7/2014 | Pletcher et al. |
| 2014/0198128 A1 | 7/2014 | Hong et al. |
| 2014/0240665 A1 | 8/2014 | Pugh et al. |
| 2014/0252868 A1 | 9/2014 | Yamada |
| 2014/0265620 A1* | 9/2014 | Hoarau .................. H01F 27/28 307/104 |
| 2014/0292620 A1 | 10/2014 | Lapstun et al. |
| 2014/0371560 A1 | 12/2014 | Etzkorn |
| 2015/0005604 A1 | 1/2015 | Biederman et al. |
| 2015/0016777 A1 | 1/2015 | Abovitz et al. |
| 2015/0060904 A1 | 3/2015 | Robin et al. |
| 2015/0062533 A1 | 3/2015 | Toner et al. |
| 2015/0072615 A1 | 3/2015 | Mofidi |
| 2015/0088253 A1 | 3/2015 | Doll et al. |
| 2015/0123785 A1 | 5/2015 | Haflinger |
| 2015/0126845 A1 | 5/2015 | Jin et al. |
| 2015/0145095 A1 | 5/2015 | Kim et al. |
| 2015/0147975 A1 | 5/2015 | Li |
| 2015/0148628 A1 | 5/2015 | Abreu |
| 2015/0150510 A1 | 6/2015 | Leonardi et al. |
| 2015/0171274 A1 | 6/2015 | Guo et al. |
| 2015/0173602 A1 | 6/2015 | Barrows |
| 2015/0223684 A1 | 8/2015 | Hinton et al. |
| 2015/0227735 A1 | 8/2015 | Chappell et al. |
| 2015/0234205 A1 | 8/2015 | Schowengerdt et al. |
| 2015/0235439 A1 | 8/2015 | Schowengerdt et al. |
| 2015/0235440 A1 | 8/2015 | Schowengerdt et al. |
| 2015/0235444 A1 | 8/2015 | Schowengerdt et al. |
| 2015/0235446 A1 | 8/2015 | Schowengerdt et al. |
| 2015/0235457 A1 | 8/2015 | Schowengerdt et al. |
| 2015/0235468 A1 | 8/2015 | Schowengerdt et al. |
| 2015/0235471 A1 | 8/2015 | Schowengerdt et al. |
| 2015/0241698 A1 | 8/2015 | Schowengerdt et al. |
| 2015/0243090 A1 | 8/2015 | Schowengerdt et al. |
| 2015/0261294 A1 | 9/2015 | Urbach et al. |
| 2015/0281411 A1 | 10/2015 | Markus et al. |
| 2015/0301338 A1 | 10/2015 | Van et al. |
| 2015/0305929 A1 | 10/2015 | Goldberg |
| 2015/0339857 A1 | 11/2015 | O'Connor et al. |
| 2015/0362750 A1 | 12/2015 | Yeager et al. |
| 2015/0362752 A1 | 12/2015 | Linhardt et al. |
| 2015/0372395 A1 | 12/2015 | Lavedas |
| 2015/0380461 A1 | 12/2015 | Robin et al. |
| 2015/0380988 A1 | 12/2015 | Chappell et al. |
| 2016/0006115 A1 | 1/2016 | Etzkorn |
| 2016/0011419 A1 | 1/2016 | Gao et al. |
| 2016/0013658 A1* | 1/2016 | Kohara .................. H02J 50/12 307/104 |
| 2016/0018650 A1 | 1/2016 | Haddick et al. |
| 2016/0018651 A1 | 1/2016 | Haddick et al. |
| 2016/0018652 A1 | 1/2016 | Haddick et al. |
| 2016/0018653 A1 | 1/2016 | Haddick et al. |
| 2016/0030160 A1 | 2/2016 | Markus et al. |
| 2016/0049544 A1 | 2/2016 | Robin et al. |
| 2016/0066825 A1 | 3/2016 | Barrows et al. |
| 2016/0080855 A1 | 3/2016 | Greenberg et al. |
| 2016/0091737 A1 | 3/2016 | Kim et al. |
| 2016/0093666 A1 | 3/2016 | Gilet et al. |
| 2016/0097940 A1 | 4/2016 | Sako et al. |
| 2016/0113760 A1 | 4/2016 | Conrad et al. |
| 2016/0141449 A1 | 5/2016 | Robin et al. |
| 2016/0141469 A1 | 5/2016 | Robin et al. |
| 2016/0143728 A1 | 5/2016 | De et al. |
| 2016/0147301 A1 | 5/2016 | Iwasaki et al. |
| 2016/0154256 A1 | 6/2016 | Yajima et al. |
| 2016/0172536 A1 | 6/2016 | Tsai et al. |
| 2016/0172869 A1 | 6/2016 | Park et al. |
| 2016/0190855 A1* | 6/2016 | Katabi .................. H02J 7/045 320/108 |
| 2016/0204307 A1 | 7/2016 | Robin et al. |
| 2016/0223842 A1 | 8/2016 | Yun et al. |
| 2016/0253831 A1 | 9/2016 | Schwarz et al. |
| 2016/0261142 A1 | 9/2016 | Park et al. |
| 2016/0270176 A1 | 9/2016 | Robin et al. |
| 2016/0270187 A1 | 9/2016 | Robin et al. |
| 2016/0276328 A1 | 9/2016 | Robin et al. |
| 2016/0299354 A1 | 10/2016 | Shtukater |
| 2017/0023793 A1 | 1/2017 | Shtukater |
| 2017/0042480 A1 | 2/2017 | Gandhi et al. |
| 2017/0168322 A1 | 6/2017 | Toner et al. |
| 2017/0188848 A1 | 7/2017 | Banet |
| 2017/0189699 A1 | 7/2017 | Dellamano |
| 2017/0231337 A1 | 8/2017 | Anderson |
| 2017/0234818 A1 | 8/2017 | Jesme |
| 2017/0255026 A1 | 9/2017 | Rakhyani |
| 2017/0270636 A1 | 9/2017 | Shtukater |
| 2017/0337461 A1 | 11/2017 | Jesme |
| 2017/0371184 A1 | 12/2017 | Shtukater |
| 2018/0036974 A1 | 2/2018 | Hahn et al. |
| 2018/0043646 A1 | 2/2018 | Lai |
| 2018/0159368 A1* | 6/2018 | Arnold .................. H02K 7/1807 |
| 2018/0203260 A1* | 7/2018 | Blum .................. G02C 7/04 |
| 2018/0212313 A1 | 7/2018 | Harper |
| 2019/0074823 A1 | 3/2019 | Der |

FOREIGN PATENT DOCUMENTS

| | | |
|---|---|---|
| WO | WO 2016/022665 | 2/2016 |
| WO | WO 2016/150630 A1 | 9/2016 |
| WO | WO 2016/195201 A1 | 12/2016 |
| WO | 2019069555 | 7/2018 |

OTHER PUBLICATIONS

Kao, H-L. et al., "DuoSkin: Rapidly Prototyping On-Skin User Interfaces Using Skin-Friendly Materials," ISWC'16, ACM, Sep. 12-16, 2016, 8 pages.

Paperno et al., A New Method for Magnetic Position and Orientation Tracking, *IEEE Transactions on Magnetics*, vol. 37, No. 4, Jul. 2001, pp. 1938-1940.

Chronos Vision GmbH, "Scleral Search Coils 2D/3D," 4 pages, [Online][Retrieved Feb. 28, 2019], Retrieved from the internet <http://www.chronos-vision.de/downloads/CV Product SSC.pdf>. (4 pages).

Kenyon, R.V., "A soft Contact Lens Search Coil for Measuring Eye Movements," Vision Research, vol. 25, No. 11, pp. 1629-1633, 1985.

Lupu, R.G. et al., "A Survey of Eye Tracking Methods and Applications," Gheorghe Asachi Technical University of Iasi, Aug. 29, 2013, pp. 71-86.

Umraiya, A, "Design of Miniaturized Coil System Using Mems Technology for Eye Movement Measurement," McGill University, Montreal, Aug. 2009, pp. i-69.

* cited by examiner

MULTI-COIL FIELD GENERATION IN AN ELECTRONIC CONTACT LENS SYSTEM

BACKGROUND

1. Technical Field

One or more embodiments of this disclosure relate to the wireless transmission of power to an electronic contact lens.

2. Description of Related Art

Augmented reality (AR) adds computer-generated information to a person's view of the world around them. One type of AR system includes an electronic contact lens, for instance using tiny video projectors (or "femtoprojectors") as described in Deering (U.S. Pat. No. 8,786,675). Generally, electronic contact lenses can't accommodate batteries of sufficient capacity to power the electronic contact lenses for very long. Accordingly, providing power to the electronic contact lenses wirelessly is an attractive alternative, and represents an active area of research and development.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

Figure 1:
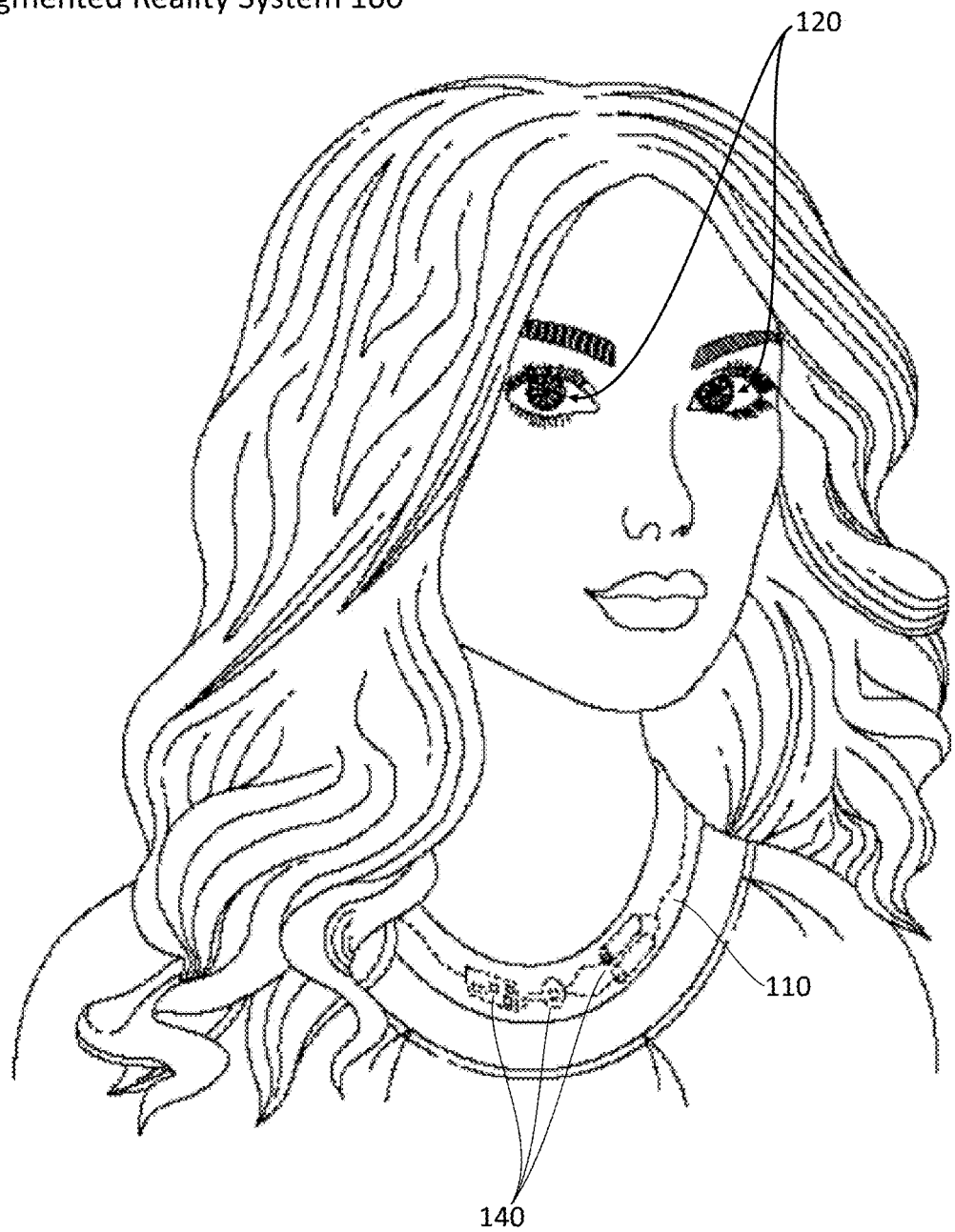
FIG. 1 shows a person wearing an augmented reality system including a necklace.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Electronic contact lenses can include devices or components that require a power source to operate. For example, an electronic contact lens can include tiny projectors, such as femtoprojectors, to project images onto the user's retina. If the contact lens display is partially transparent, then the image from the femtoprojector is combined with the external scene viewed by the user though the contact lens, thus creating an augmented reality.

One way that power can be supplied to an electronic contact lens is through magnetic induction. An energy source, for instance a source coil worn as a necklace, can produce a time-varying magnetic field ("TVMF"). An electronic contact lens including a reciprocal coil can inductively couple to the energy source by converting current in the reciprocal coil caused by the TVMF into power. However, the amount of power produced by the contact lens depends on the angle between the contact lens and the direction of the magnetic field. In other words, the coupling between the contact lens and the energy source is strongest when the direction of the TVMF is orthogonal to plane of the contact lens coil, and is increasingly weaker as this angle decreases.

In practice, the orientation of an electronic contact lens will frequently change as the eye wearing the lens moves relative to the power source. Accordingly, when the TVMF produced by the power source is relatively stable, the orientation of the contact lens relative to the direction of the TVMF will change over time, thereby changing the strength of coupling between the contact lens and the power source over time. Unfortunately, during periods of time when the strength of coupling between the contact lens and the power source is relatively weak, the amount of power available to the contact lens may be reduced.

To address such instances, the power source can include multiple conductive coils, each configured to produce a TVMF in a different direction. The direction of the resulting TVMF at the contact lens can rotate, for instance if the conductive coils are driven with currents at the same frequency but with a phase difference. The conductive coils can be driven autonomously to produce a rotating magnetic field, for instance without feedback from the contact lens. As discussed below, a rotating magnetic field can increase an amount of power produced by the contact lens relative to a stationary magnetic field.

A sensor (for instance, embedded within the contact lens or external to the contact lens) can provide feedback to the power source. Based on this feedback, the magnetic fields produced by the conductive coils of the power source can be adjusted so that the resulting magnetic field at the contact lens is pointed in a different direction. For instance, a power sensor can provide an indication of an amount of power produced by the contact lens to the power source, which in turn can adjust the magnitude of current provided to one or more of the conductive coils of the power source. Another type of feedback identifies an orientation of the contact lens, and the power source can vary the magnetic fields produced by the conductive coils based on this orientation.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIG. 1 shows a person wearing an augmented reality system 100 including a visible necklace 110. Even though the necklace 110 is in plain sight, it may be designed to look like ordinary jewelry and therefore attracts no special notice. In some configurations, the necklace can be hidden underneath the wearer's clothes. Whatever the design of the necklace 110, it does not alter one's impression of the person wearing it. Their appearance other than the addition of the necklace 110 is not affected by the AR system.

Furthermore, the AR system of FIG. 1 does not disturb the wearer. The contact lens displays 120 may also function as regular contact lenses providing refractive eyesight correction if required. The necklace 110 is lightweight and may not need to be held in one's hand like a cell phone or tablet. When the contact lens displays 120 are not showing images, the wearer is hardly conscious of the AR system 100. When the AR system 100 is displaying images, reacting to speech or receiving messages, it provides functions like that of a smartphone but in a more natural way.

In the illustrated necklace 110 of FIG. 1, the necklace 110 includes hardware elements 140 distributed about a band of the necklace 110 which allows for a broader range of necklace designs suitable to a variety of aesthetic tastes. Generally, the band includes a surface configured to be placed against the wearer of the necklace 110 when the necklace 110 is worn about the neck. In other configurations, the necklace includes hardware elements localized to a pendant of the necklace (as in FIG. 2A). Generally, the pendant may be an ornamental object hanging from the necklace 110 that is configured to enclose and conceal the hardware elements 140 of the AR system 100.

While the AR system 100 is illustrated with a necklace 110, in other embodiments the functions of the necklace 110 described herein can be integrated into another type of wearable device. As an example, the functionality of the necklace 110 can be embedded in a necktie, a scarf, a belt, the brim of a hat, the collar of a shirt, the hood of a jacket, the sleeve of a sweater, the front of a t-shirt, etc. Alternatively, the necklace 110 can be coupled to an external electronic device (not pictured) such as a smart phone and the coupled electronic device may facilitate functionality of the AR system 100.

Figure 2A:
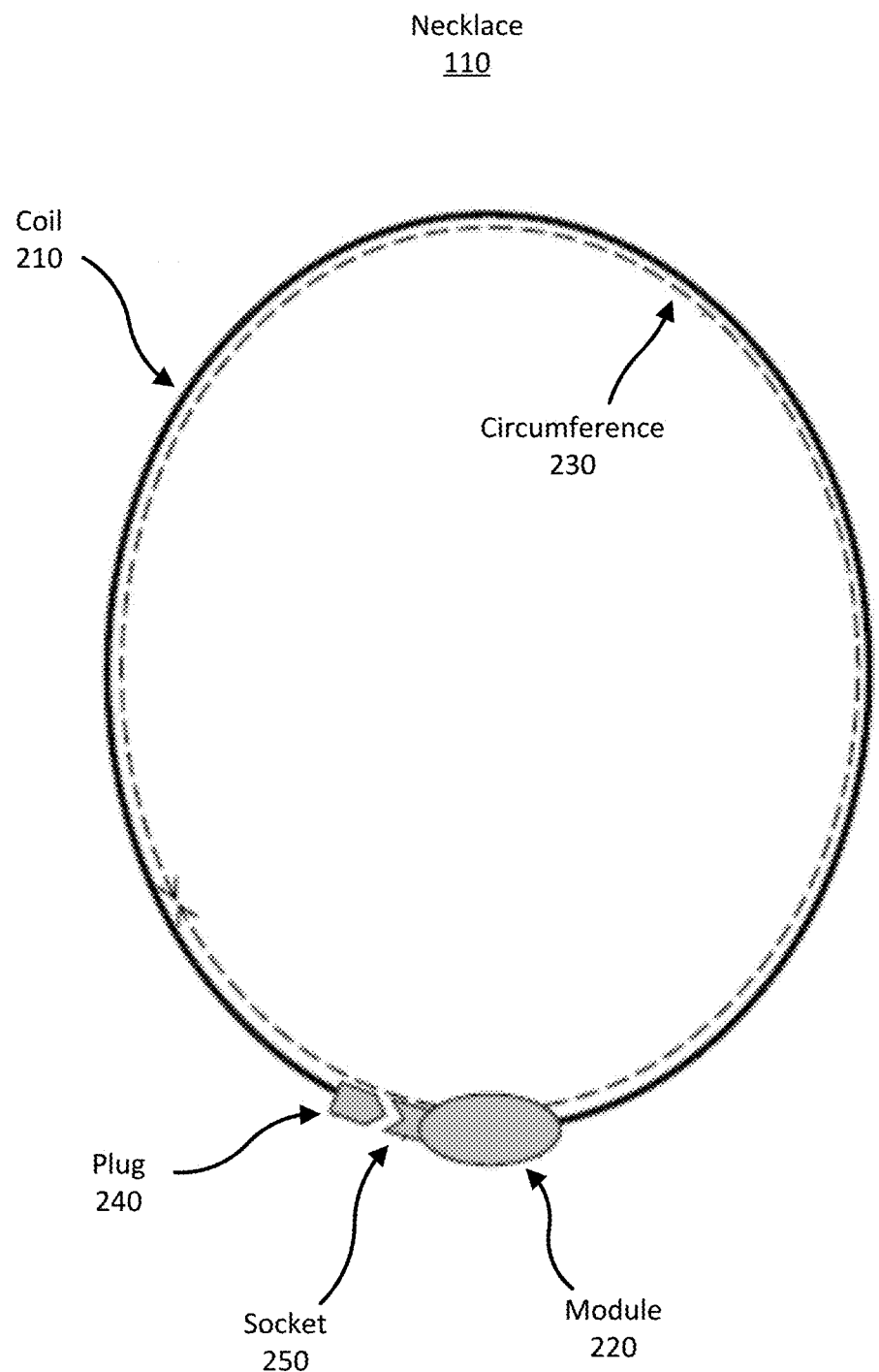
FIG. 2A shows a necklace of an augmented reality system.

FIG. 2A shows a necklace 110 of an unobtrusive augmented reality system 100. In the illustrated embodiment, the necklace 110 includes a coil 210 of conductive material such as an insulated wire and an electronic module 220 ("conductive coil" hereinafter). Module 220 contains the hardware elements 130 for controlling the augmented reality system 100. In some configurations, the module 220 is a pendant of the necklace. In other configurations, the necklace 110 does not include a module 220 and the hardware elements 140 are distributed about the circumference 230 of the necklace (i.e., as in FIG. 1). While not illustrated, the conductive coil 210 and module 220 can be incorporated into the band of the necklace. In some cases, the circumference 230 of the necklace is the inner diameter of the necklace band.

Additionally, the number of conductive loops in necklace coil 210 is chosen considering factors such as power requirements of contact lens displays 120, operating frequency, etc. The number of loops in necklace coil 210 can be, for example, between 1 and 20 loops, which each loop including as many as 2500 or more insulated strands connected in parallel. In some configurations, an unlicensed frequency band can be used to couple the necklace 110 to the contact lens display 120, but any other frequency can be used. In one example, the system can use an industrial, scientific, and medical radio band (ISM).

Furthermore, conductors in the coil 210 may extend around the circumference 230 of the necklace 110 for one, two, three, or more loops. These loops may be connected or disconnected with a plug 240 and socket 250 when putting the necklace 110 on or taking it off. Connecting the plug 240 to the socket 250 allows data and power to be transmitted between the necklace 110 and contact lens display 120, and disconnecting the plug 240 from the socket 250 prevents data and power from being transmitted between the necklace 110 and contact lens display 120. Generally, the coil 210 is configured to be worn around a user's neck as a necklace 110 when the plug 240 and socket 250 are connected. In some configurations, the necklace 110 does not include a plug 240 and socket 250 but still allows for data and power to be transmitted between the necklace 110 and contact lens display 120. In these configurations, any other means of controlling data and power transfer can be included (e.g., a switch, a button, etc.).

In various embodiments, as a wearer of necklace 110 operates the AR system 100 and moves through the environment, the orientation of necklace 110 may vary with that movement (i.e., the shape of the band of necklace may change, relative orientations of the hardware elements 140 in necklace 110 change, etc.).

Figure 2B:
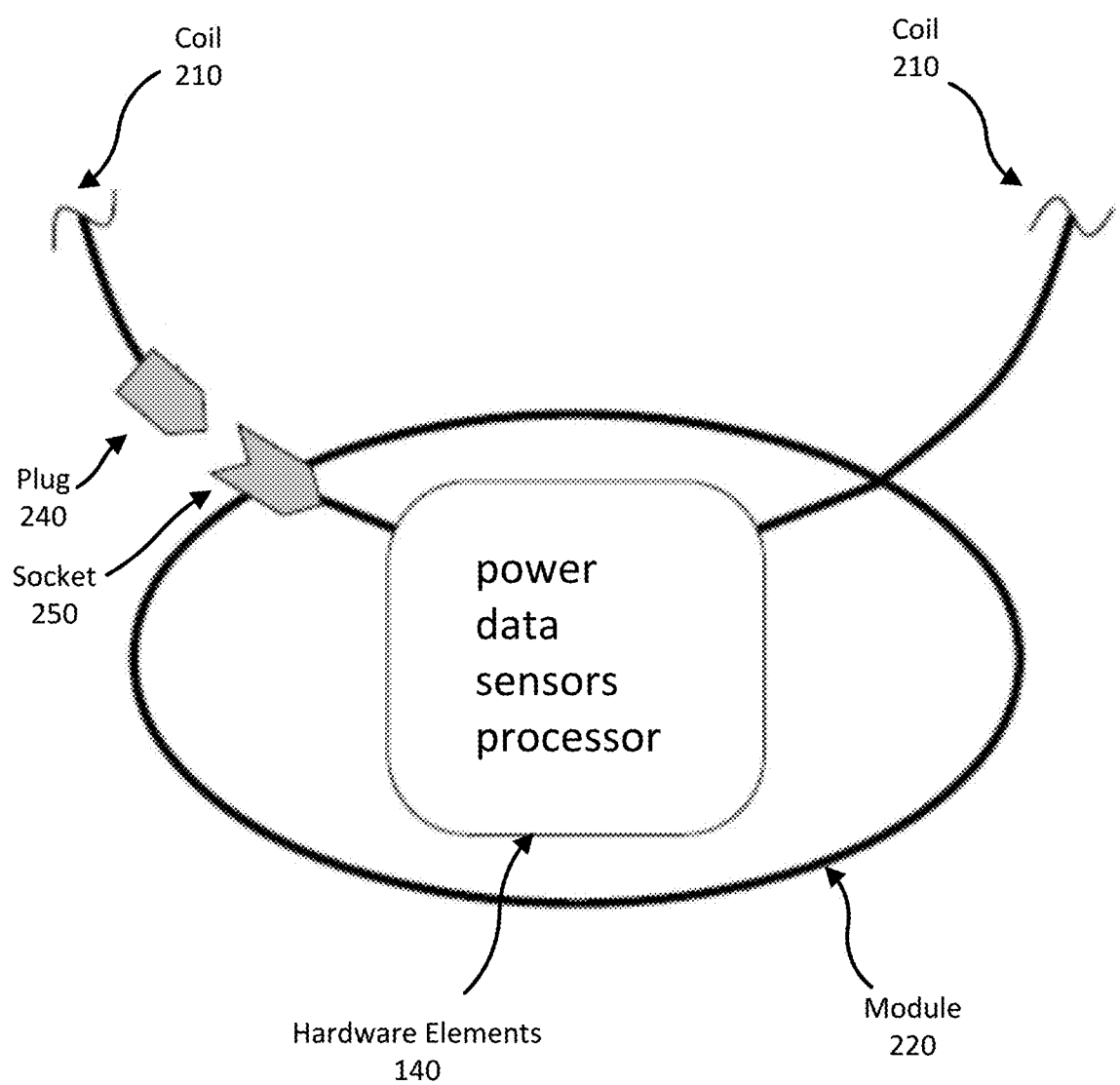
FIG. 2B shows a representation of the control electronics contained within the necklace of an augmented reality system.

FIG. 2B shows a necklace 110 of the augmented reality system 100. In the illustrated embodiment, the necklace 110 includes a module 220 that may have an exterior appearance of jewelry or a fashion accessory. However, the module 220 may contain additional hardware elements 140 such as: a power source such as a battery; a modulator to drive a radio-frequency current in the necklace coil; a data modem to encode data on the radio-frequency signal; sensors such as microphones, cameras, inertial sensors, GPS receivers, barometric pressure sensors, etc.; a cellular radio; a Wi-Fi radio; a Bluetooth radio; a graphics processing unit; and/or, a microprocessor and memory. In other configurations, the hardware elements 140 included in module 220 may be distributed about the necklace band.

When the hardware elements 140 produce a radio-frequency current (or any other alternating current) in the necklace coil 210, power may be inductively coupled into a lens coil embedded in a contact lens display 120. Data may also be transmitted to the contact lens display 120 by modulating the radio-frequency current in the necklace coil 210. Amplitude, frequency, and phase modulation are examples of modulation schemes that may be employed. For example in frequency shift keying, a pair of discrete frequencies are used to indicate logical "0" and logical "1".

The hardware elements 140 may include a microphone (or multiple microphones) to sense voices and other sounds. The wearer of an augmented reality system 100 may control the system by speaking to it, for example. The system 100 may also include hardware elements 140 such as a speaker and/or wireless connection to earphones. The system 100 may be controlled via a touch sensor in the necklace or via gestures detected by hardware elements 140 including radar (e.g. 60 GHz radar), ultrasonic and/or thermal sensors.

Additional hardware elements such as inertial (acceleration and rotation rate) sensors, coupled with a barometric pressure sensor and a GPS receiver may provide position and velocity data to the AR system 100. Further, cellular radio and/or Wi-Fi radio hardware elements can provide connections to voice and/or data networks. Finally, a processor, graphics processing unit and memory can run applications and store data. Broadly, the hardware elements 140 are configured to transmit data and images for projection by a contact lens display 120 onto a wearer's retina.

When the AR system 100 is connected to an external electronic device, any of the sensors, processors and other components mentioned above may be located in the electronic device. Alternatively, the hardware elements 140 of the necklace 110 may connect to an electronic device wirelessly or it may connect physically via a plug-and-socket connector or another type of connector.

Figure 3A:
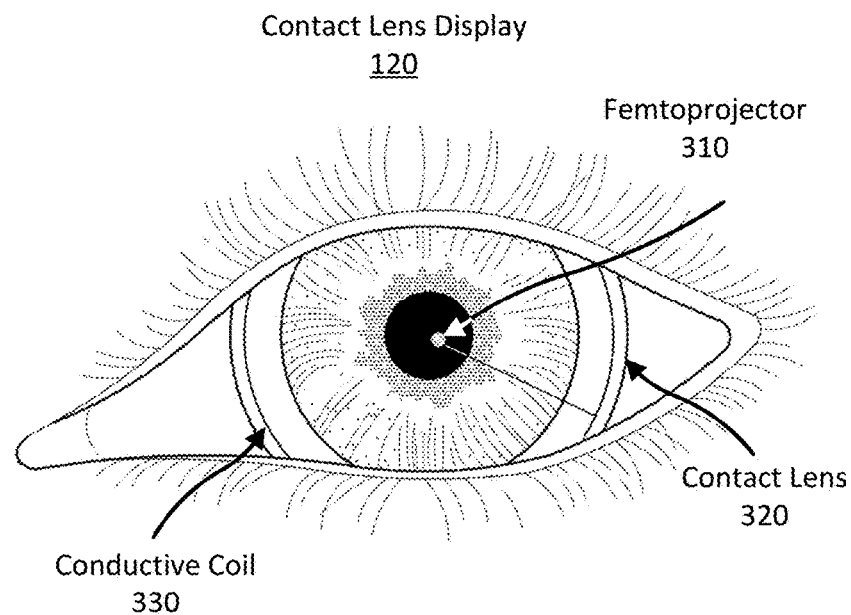
FIG. 3A shows a plan view of a contact lens display mounted on a person's eye.

FIG. 3A shows a contact lens display 120 mounted on a person's eye. The contact lens display 120 includes a femtoprojector 310 mounted in a contact lens 320, and a conductive coil (or "lens coil") 330 near the edge of the contact lens 320 for receiving power and data wirelessly from the necklace 110 as in FIGS. 2A-2B. The femtoprojector 310 may include electronics for harvesting power from the lens coil 330 in the contact lens 320, processing data transmitted to the contact lens 320, and driving a light emitter inside the femtoprojector 310. The femtoprojector 310 projects images on a wearer's retina.

Figure 3B:
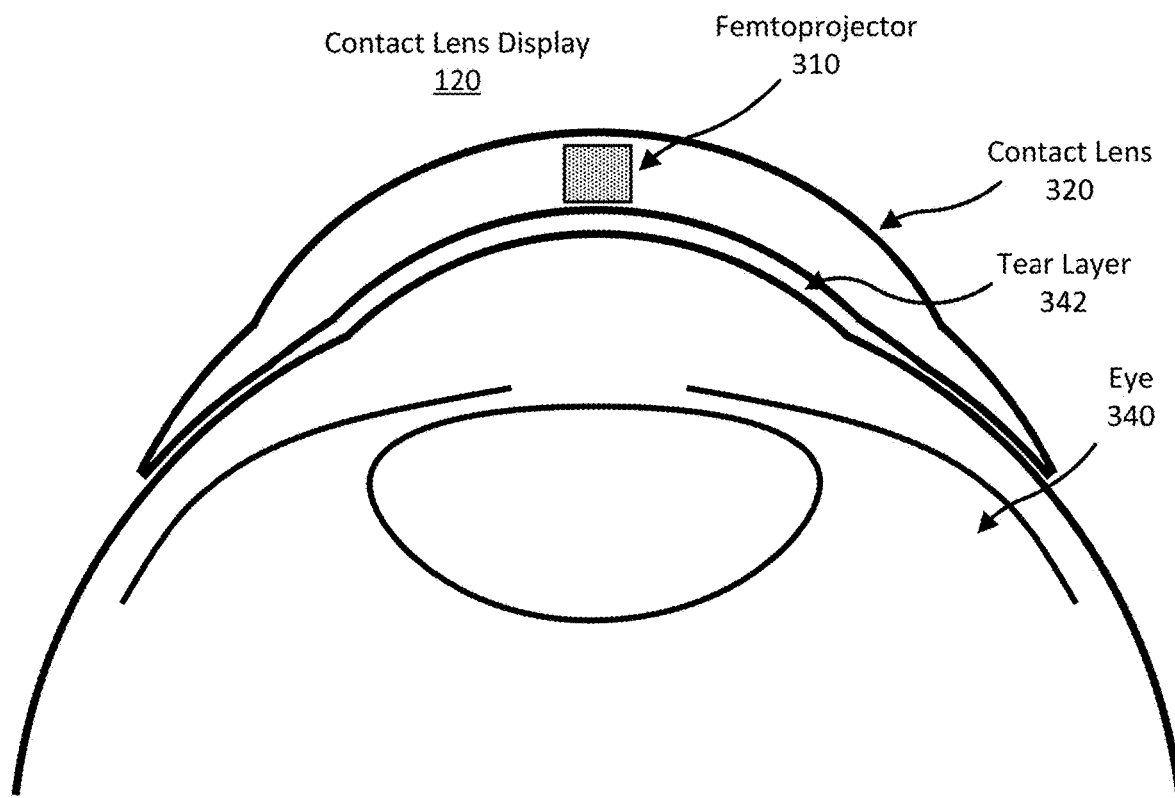
FIG. 3B shows a cross-sectional view of a contact lens display mounted on a person's eye.

FIG. 3B shows a cross-sectional view of a contact lens display 120 containing a femtoprojector 310 in a contact lens 320. FIG. 3B shows an embodiment using a scleral contact lens but the contact lens does not have to be scleral (i.e., it could be a soft contact lens). The contact lens 320 is separated from the cornea of the user's eye 340 by a tear layer 342. The contact lens display 120 has an outer surface facing away from the eye 340 and an inner surface contacting the tear layer 342. Generally, the femtoprojector 310 is positioned between the front surface and the back surface of the contact lens 320. The contact lens 320 preferably has a thickness that is less than 2 mm, and the femtoprojector 310 preferably fits in a 2 mm by 2 mm by 2 mm volume. The contact lens 320 is comfortable to wear and maintains eye health by permitting oxygen to reach the user's eye 340.

Figure 3C:
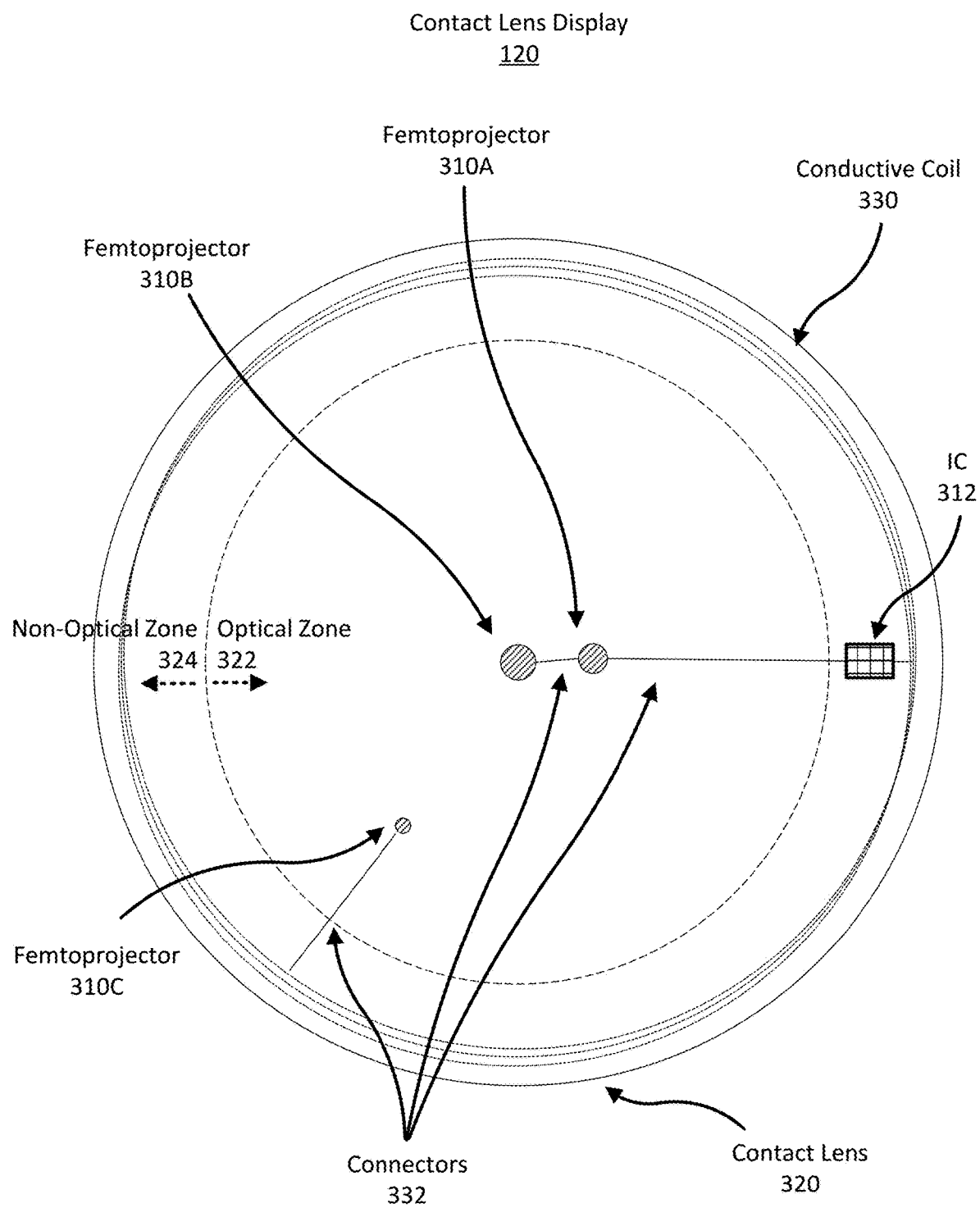
FIG. 3C shows a plan view of the contact lens display of FIG. 3A in more detail.

FIG. 3C shows the contact lens display 120 of FIGS. 3A-3B in more detail. FIG. 3C shows a frontal view of a contact lens display 120 with multiple femtoprojectors 310A-310C in a contact lens 320. The conductive coil 330 in the contact lens 320 may have between about 1 and about 200 loops arranged in a spiral and which extend along a peripheral region of the contact lens display 120. In other configurations, the conductive coil 330 can be arranged in a cylindrical coil or any other looped shape. The conductive coil 330 is connected to the femtoprojectors 310 and other electronics via embedded connectors 332. The femtoprojectors 310 are located in a central region of the contact lens display 120 which is surrounded by the conductive coil 330. The femtoprojector 310, conductive coil 330, and electronics are enclosed in lens material such that the lens feels to a wearer like a conventional contact lens. The contact lens 320 is between about 6 mm and about 25 mm in diameter and preferably between about 8 mm and about 16 mm in diameter.

The ratio of the contact lens 320 diameter to femtoprojector 310 lateral size can be roughly 25:1 for the largest femtoprojector. This ratio is normally between about 15:1 and 30:1, but may be as small as 5:1 or as large as 50:1. FIG. 3C shows three femtoprojectors 310A-C in the contact lens 320, but many femtoprojectors, or only one, may be mounted in such a contact lens 320. Eye-mounted displays with as many as 49 femtoprojectors in a contact lens 320 have been proposed. If there is only one femtoprojector 310 in a contact lens 320, it need not be in the center of the lens.

The femtoprojectors 310 in FIG. 3C are also shown as different sizes. The entire display, made up of all the femtoprojectors 310, may be a variable resolution display that generates the resolution that each region of the eye can actually see, vastly reducing the total number of individual "display pixels" required compared to displays of equal resolution and field of view that are not eye-mounted. For example, a 400,000 pixel eye-mounted display using variable resolution can provide the same visual experience as a fixed external display containing tens of millions of discrete pixels.

In FIG. 3C, the contact lens 320 is roughly divided by the dashed circle into an optical zone 322 and a non-optical zone 324. Components in the optical zone 322 may be in the optical path of the eye 340, depending on how far open the iris is. Components in the non-optical zone 324 fall outside the aperture of the eye 340. Accordingly, active optical elements are generally positioned in the optical zone 322 and non-active optical elements are positioned in the non-optical zone 324. For example, femtoprojectors 310 are within the optical zone 322 while the conductive coil 330 is in the non-optical zone 324. Additionally, the contact lens 320 may also contain other components positioned in the non-optical zone 322 for data processing, data transmission, and power recovery and/or positioning. As an example, an integrated circuit (IC) 312 is positioned in the non-optical zone 324 and is connected to the femtoprojectors 310.

The contact lens display 120 can also include other components such as antennae or optical/infrared photodetectors, data storage and buffering, controls, and possibly also on-lens processing components. The contact lens display can include positioning components such as accelerometers and fiducial or other structures used for eye tracking and head tracking. The contact lens display 120 can also include data processing components, and can include a microprocessor or other data processing elements.

There are many ways in which the functions of receiving power and data and projecting the data onto the retina of a wearer can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs. Some components may be included in external devices such as a watch, a cell-phone, a laptop, etc.

Figure 4:
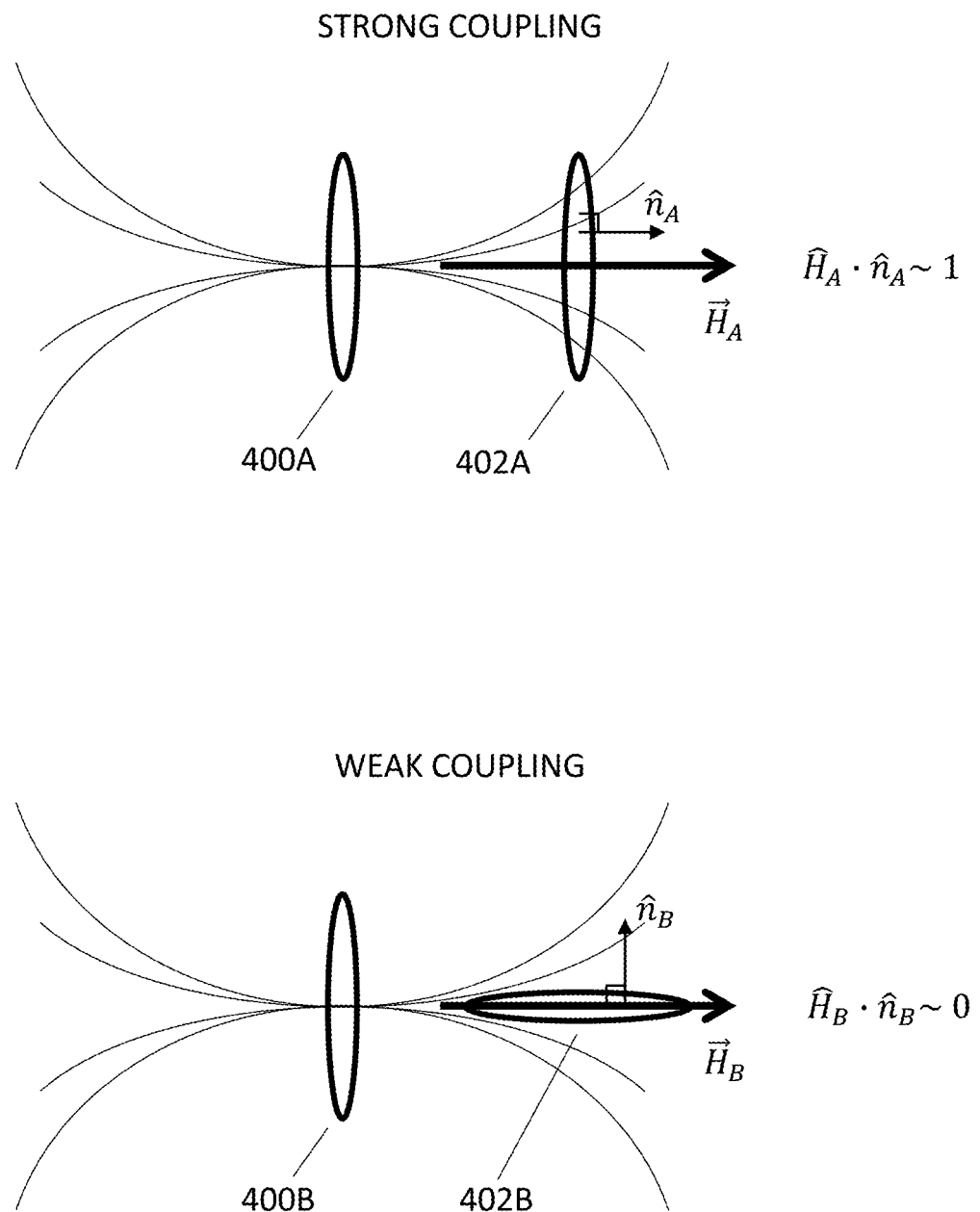
FIG. 4 is a diagram illustrating a strong inductive coupling and a weak inductive coupling between conductive coil pairs.

FIG. 4 is a diagram illustrating a strong inductive coupling and a weak inductive coupling between conductive coil pairs. The strong inductive coupling is between a first source conductive coil 400A and a first reciprocal conductive coil 402A. The first source conductive coil 400A generates a TVMF in a direction indicated by the vector $\vec{H}_A$. The vector $\vec{H}_A$ is orthogonal to the plane defined by the first reciprocal conductive coil 402A. Stated differently, the unit vector $\hat{n}_A$ that is orthogonal to the plane defined by the first reciprocal conductive coil 402A is parallel to the vector $\vec{H}_A$. As a result, the inductive coupling between the first source conductive coil 400A and the first reciprocal conductive coil 402A, represented by the dot product $\hat{H}_A \cdot \hat{n}_A \sim 1$, is a strong coupling, where $\hat{H}_A$ is the unit vector in the direction of $\vec{H}_A$.

The weak inductive coupling illustrated by FIG. 4 is between a second source conductive coil 400B and a second reciprocal conductive coil 402B. The second source conductive coil 400B generates a TVMF in a direction indicated by the vector $\vec{H}_B$. The vector $\vec{H}_B$ is parallel to the plane defined by the second reciprocal conductive coil 402B. Stated differently, the unit vector $\hat{n}_B$ that is orthogonal to the plane defined by the second reciprocal conductive coil 402B is orthogonal to the vector $\vec{H}_B$. As a result, the inductive coupling between the second source conductive coil 400B and the second reciprocal conductive coil 402B, represented by the dot product $\hat{H}_B \sim 0$, is a weak coupling.

A strong inductive coupling is a coupling between conductive coils in which the angle θ between the direction of the TVMF produced by a first conductive coil and a vector orthogonal to a second conductive coil is zero or close to zero (e.g., 20 degrees or less, 10 degrees or less, and the like), and results in an increased amount of wireless power transfer relative to a weak inductive coupling. Likewise, a weak inductive coupling is a coupling between conductive coils in which the angle θ between the direction of the TVMF produced by a first conductive coil and a vector orthogonal to a second conductive coil is 90 degrees or close to 90 degrees (e.g., 70 degrees or more, 80 degrees or more, and the like). As noted above, the strength of an inductive coupling between conductive coils is proportional to the cosine of the angle θ between the direction of the TVMF produced by a first conductive coil and a vector orthogonal to a second conductive coil.

Referring back to FIG. 1, the necklace 110 (a source conductive coil) can generate a TVMF, and can transmit power and/or data to the contact lens display 120 (a reciprocal conductive coil) via inductive coupling. Generally, the necklace 110 is worn around a user's neck during operation of the AR system 100. As a result, the direction of the TVMF produced by the necklace 110 is generally consistent, and the strength of coupling between a contact lens worn by a wearer of the necklace and the necklace itself varies as the orientation of the contact lens relative to the necklace varies.

Figures 5A, 5B, 5C:
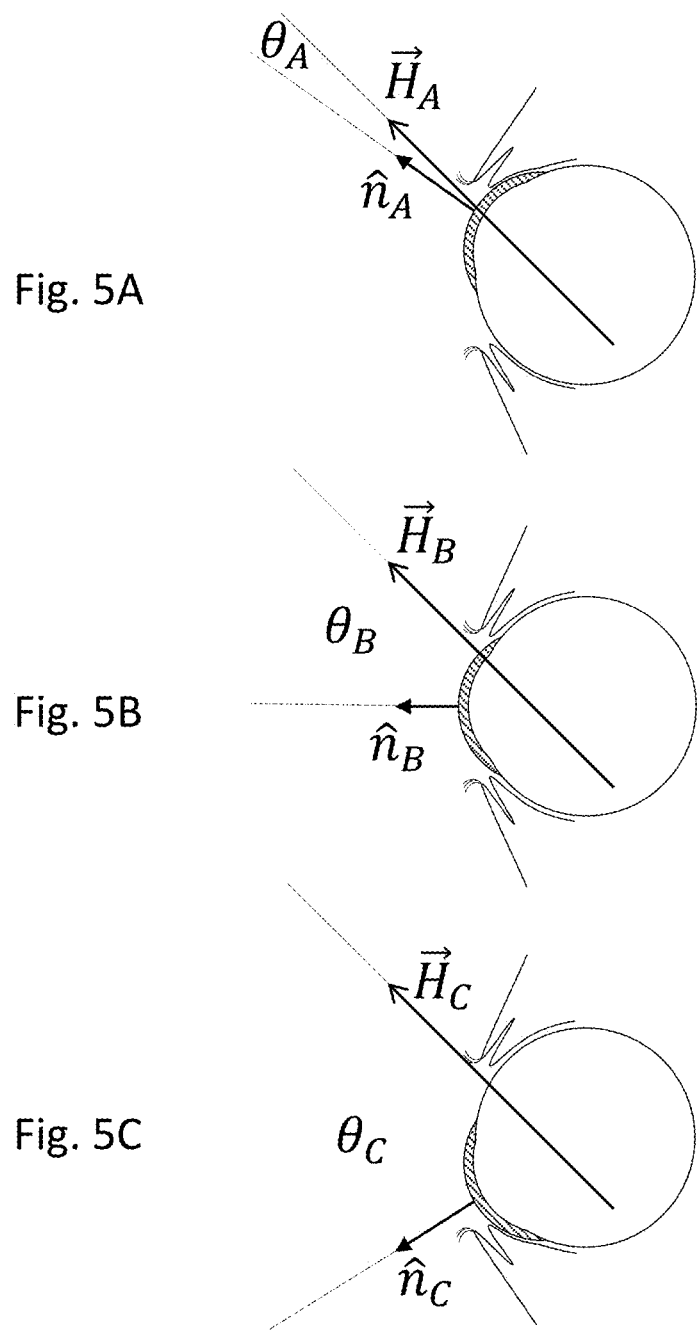
FIGS. 5A-5C show various orientations of an eye wearing an electronic contact lens in the presence of a magnetic field as the eye moves within the eye socket.

FIGS. 5A-5C show various orientations of an eye wearing an electronic contact lens in the presence of a magnetic field as the eye moves within the eye socket. In the example of FIG. 5A, an eye is looking upwards, and the angle between the direction of the TVMF $\vec{H}_A$ produced by a necklace 110 and the vector $\hat{n}_A$ orthogonal to the plane defined by a reciprocal coil of a contact lens is $\theta_A$. In the example of FIG. 5B, an eye is looking forwards, and the angle between the direction of the TVMF $\vec{H}_B$ produced by a necklace 110 and the vector 11B orthogonal to the plane defined by a reciprocal coil of a contact lens is $\theta_B$. Finally, in the example of FIG. 5C, an eye is looking forwards, and the angle between the direction of the TVMF $\vec{H}_C$ produced by a necklace 110 and the vector $\hat{n}_C$ orthogonal to the plane defined by a reciprocal coil of a contact lens is $\theta_C$. In the examples of FIGS. 5A-5C, the angle $\theta_A$ is smaller than the angle $\theta_B$, which in turn is smaller than the angle $\theta_C$; as a result, the coupling illustrated in FIG. 5A is stronger than the coupling illustrated in FIG. 5B, which in turn is stronger than the coupling illustrated in FIG. 5C.

Figure 6A:
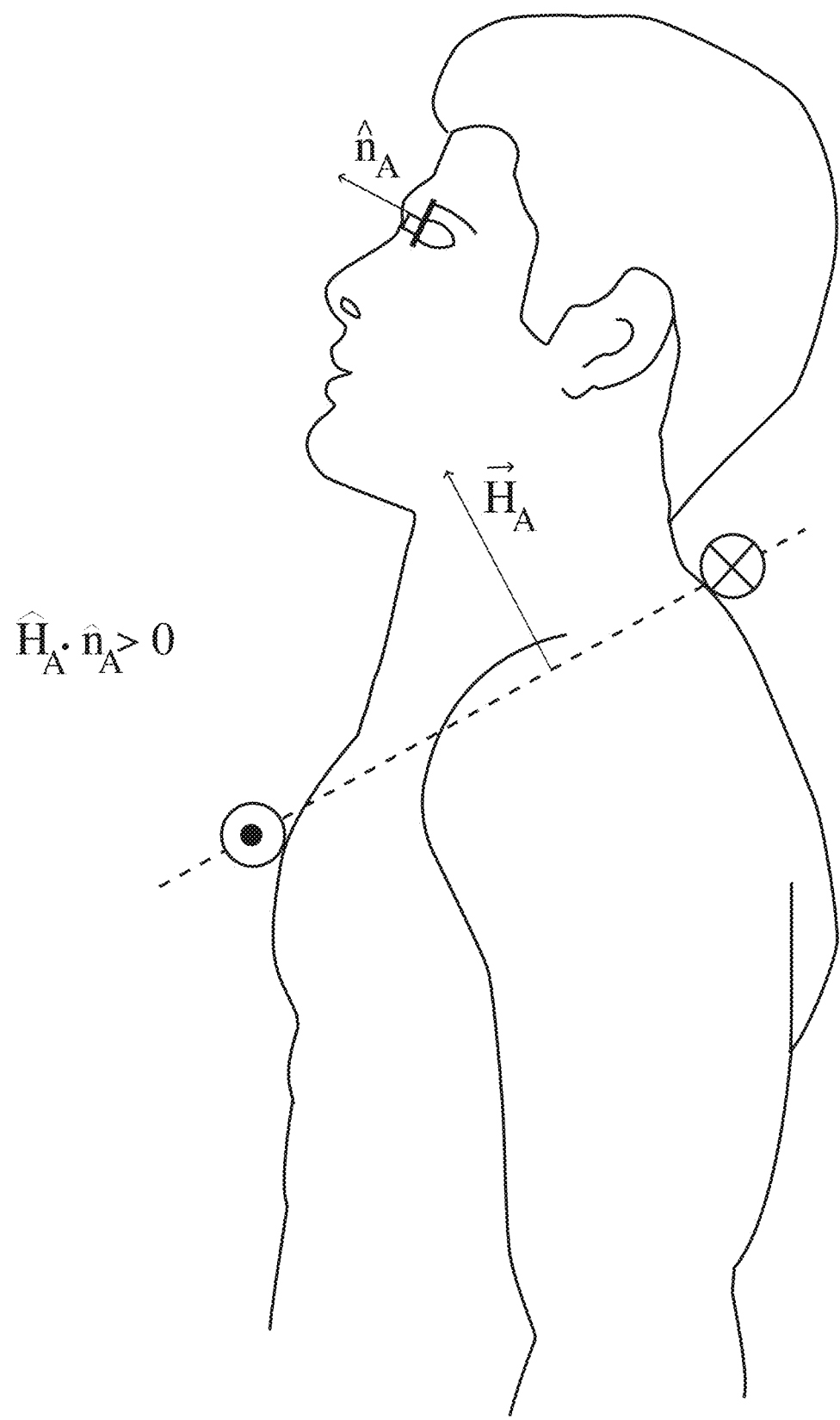
FIGS. 6A-6C show the relative coupling strength between an electronic contact lens and a necklace producing a magnetic field for the relative eye orientations of FIGS. 5A-5C, respectively, as a user's head tilts upwards and downwards.
Figure 6B:
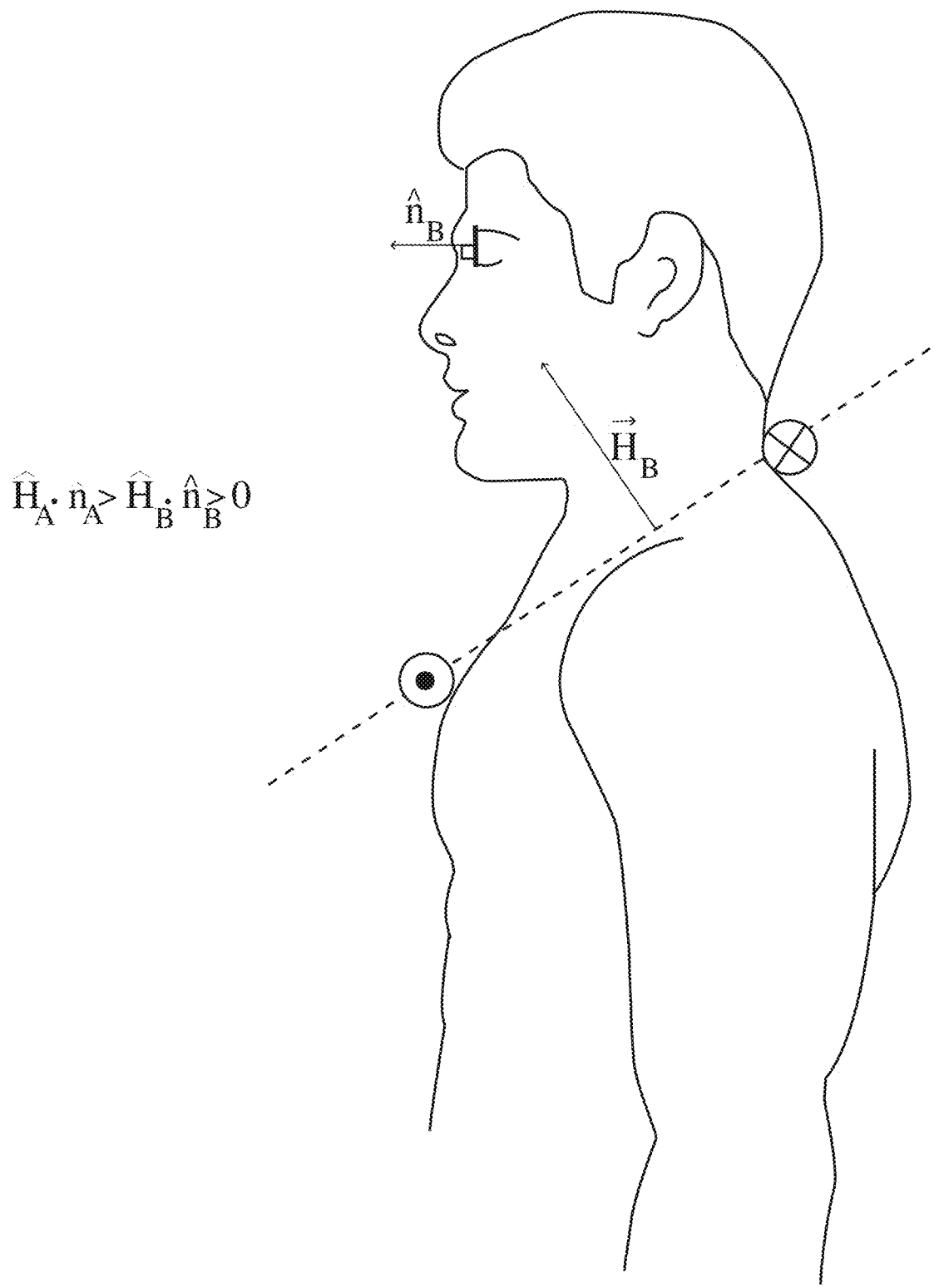
Figure 6C:
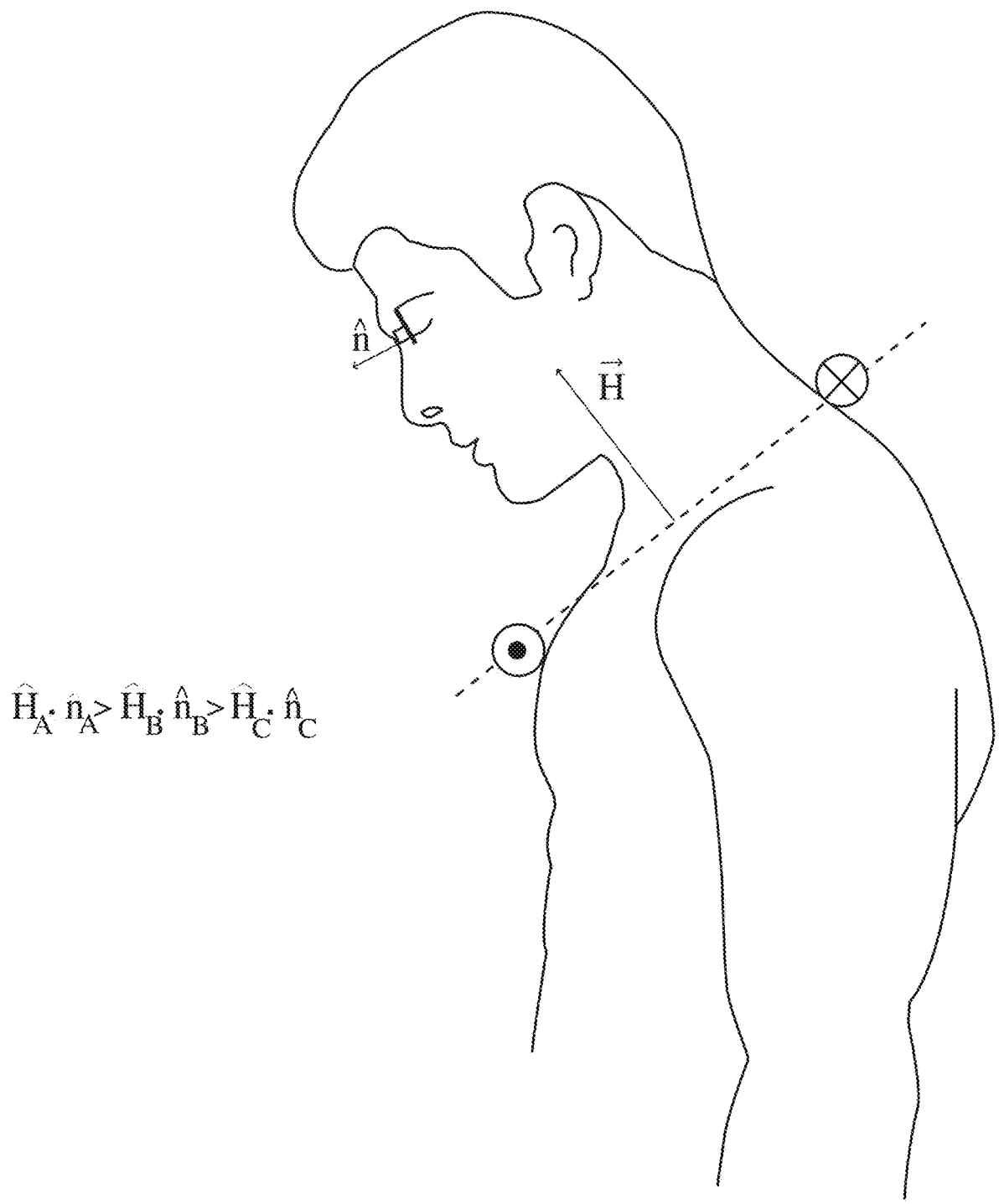

FIGS. 6A-6C show the relative coupling strength between an electronic contact lens and a necklace producing a magnetic field for relative eye orientations of FIGS. 5A-5C, respectively, as a user's head tilts upwards and downwards (and with a fixed eye orientation relative to the user's head). It should be noted that the change in relative orientation illustrated in FIGS. 5A-5C may be due to the movement of the eye within the socket and the change in orientation illustrated in FIGS. 6A-6C may be due to the movement of head, movement of the eyes relative to the head, or a combination of the two. The orientations of the eye relative to the power source shown in FIGS. 5A-5C are approximately equal to the orientations of the eye shown in FIGS. 6A-6C. In the example of FIG. 6A, which illustrates the eye orientation of FIG. 5A, the strength of the inductive coupling between the necklace and contact lens is represented by the dot product $\hat{H}_A \cdot \hat{n}_A$. In the example of FIG. 6B, which illustrates the eye orientation of FIG. 5B, the strength of the inductive coupling between the necklace and the contact lens is represented by the dot product $\hat{H}_B \cdot \hat{n}_B$, which is less strong than the inductive coupling illustrated in FIG. 6A. Likewise, in the example of FIG. 6C, which illustrates the eye orientation of FIG. 5C, the strength of the inductive coupling between the necklace and the contact lens is represented by the dot product $\hat{H}_C \cdot \hat{n}_C$, which is less strong than the inductive coupling illustrated in FIG. 6B.

Figure 7:
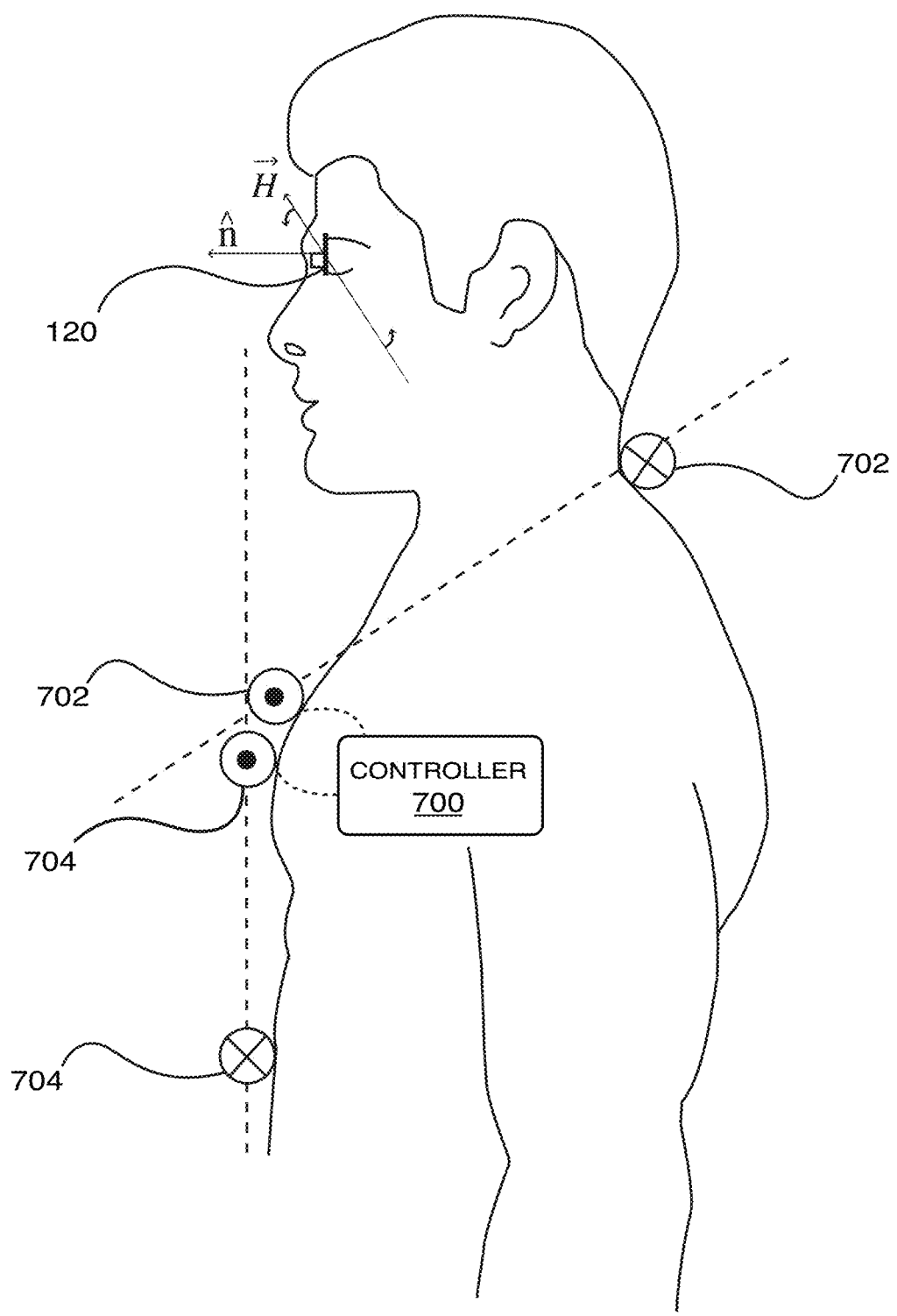
FIG. 7 shows a cross-section view of system with two conductive coils for providing power to an electronic contact lens.

In order to compensate for the varying eye orientations of a user wearing an electronic contact lens (and the resulting changes in strength of inductive coupling between the contact lens and the necklace), a user can wear a power source that includes two conductive coils arranged a different orientations. FIG. 7 shows a cross-section view of a system with two conductive coils for providing power to an electronic contact lens 120. The system of FIG. 7 includes a first source conductive coil 702 worn around a neck of a user and a second source conductive coil 704 worn on a chest of the user. Each source conductive coil 702 and 704 produce a corresponding TVMF, and as the source conductive coils 702, 704 are worn in different orientations, the directions of each corresponding TVMF produced by the source conductive coils 702, 702 are different.

The embodiment of FIG. 7 further includes a controller 700 configured to drive current through the source conductive coils 702 and 704. The controller 700 is illustrated as a single controller, but it should be noted that in practice, the controller can include two or more controllers, for instance one for each source conductive coil to drive current independently in each coil. The controller 700 is also shown as external to, but coupled to, each source conductive coil, but in practice, a controller can be implemented within the same necklace as a source conductive coil. Although not illustrated in the embodiment of FIG. 7, the controller 700 can include components such as a power source (such as a battery) from which the controller can draw power to drive source conductive coils, a transceiver enabling the controller to send and receive signals to and from the contact lens 120 or any other entity, or any other components necessary to enable the controller to perform the functions described herein.

In the embodiment of FIG. 7, the controller 700 drives the source conductive coils 702 and 704, for instance with alternating currents that cause each source conductive coil to produce a TVMF. Each source conductive coil, in response to an alternating current with a positive magnitude being driven through the source conductive coil, produces a magnetic field in a first direction orthogonal to the plane defined by the source conductive coil. Likewise, each source conductive coil, in response to an alternating current with a negative magnitude being driven through the source conductive coil, produces a magnetic field in a second direction opposite the first direction. As the magnitude of the alternating current being driven through a source conductive coil increases and decreases, for instance sinusoidally, the resulting magnitude of the magnetic field produced by the source conductive coil sinusoidally increases and decreases, alternating between a first maximum magnitude in the first direction and a second maximum magnitude in the second direction opposite the first direction.

In some embodiments, the controller 700 can drive alternating currents through the source conductive coils 702 and 704 such that the direction of the magnetic field at the contact lens 120 resulting from the TVMFs produced by the source conductive coils 702 and 704 (the "resulting magnetic field" hereinafter) rotates over time. For instance, the controller 700 can drive a first alternating current through the source conductive coil 702 at a particular frequency, and can drive a second alternating current through the source conductive coil 704 at the same frequency, but with a phase difference between the first alternating current and the second alternating current. The end result is that the direction of the net magnetic field resulting from the collective effect of the TVMFs produced by the source coils 702 and 704 rotates at the same frequency as the alternative current with which the source conductive coils are driven as a result of the phase difference between the alternating currents.

Figure 8:
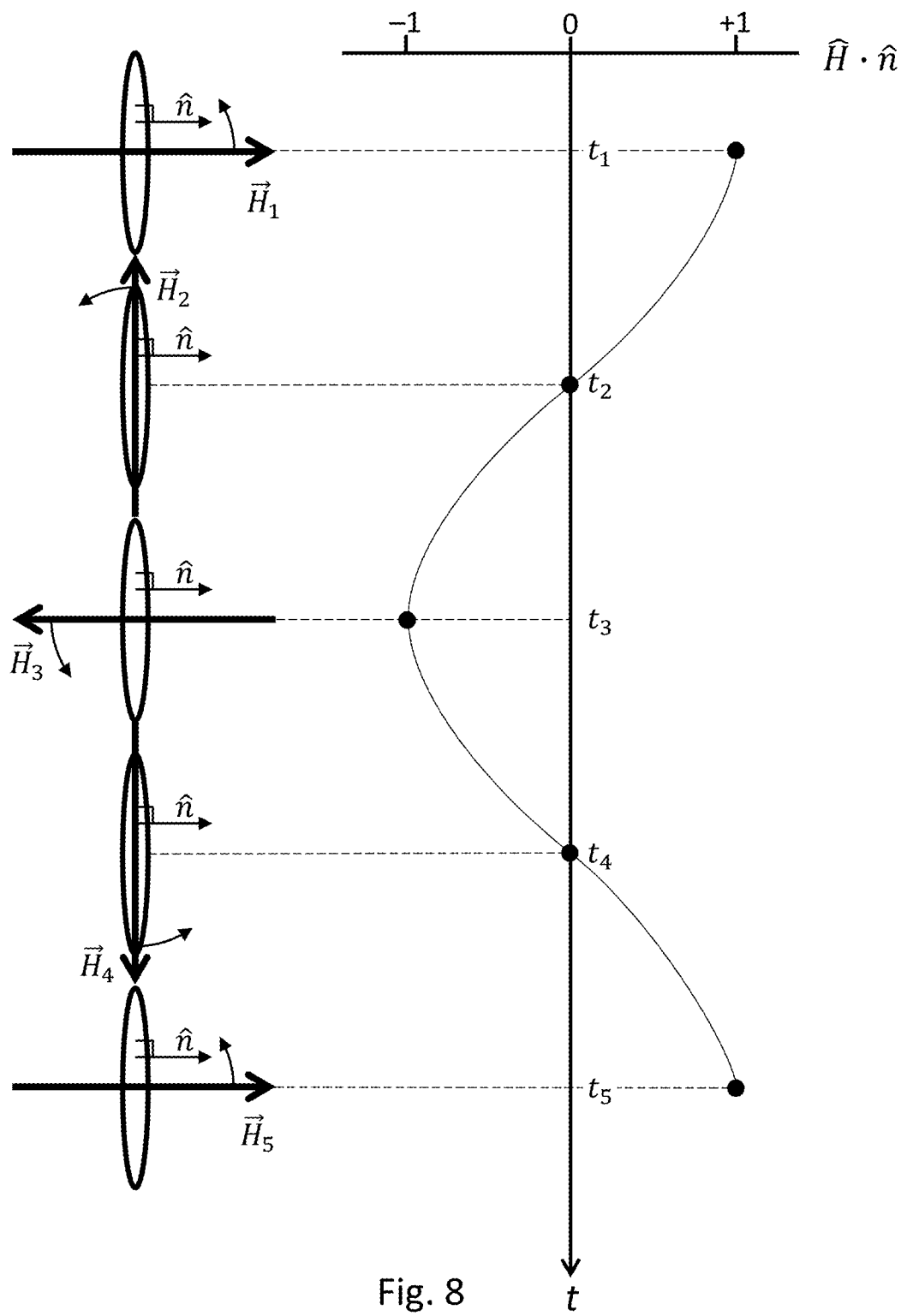
FIG. 8 shows a rotating magnetic field produced by the system of FIG. 7.

FIG. 8 shows a rotating magnetic field $\vec{H}$ produced by the system of FIG. 7. In the embodiment of FIG. 8, the resulting magnetic field $\vec{H}$ produced by the source conductive coils 702 and 704 of FIG. 7 is illustrated at five distinct times: $t_1$, $t_2$, $t_3$, $t_4$, and $t_5$. At time $t_1$, the direction of the resulting magnetic field $\vec{H}$ at the reciprocal conductive coil (e.g., the contact lens) is parallel to the vector $\hat{n}$, which is orthogonal to the plane defined by the reciprocal conductive coil. The resulting magnetic field $\vec{H}_1$ is equal in magnitude and direction to the sum of the magnetic field produced by the source conductive coil 702 and the magnetic field produced by the source conductive coil 704. For example, if the phase difference between the first alternating current and the second alternating current is 90 degrees, then the magnetic field produced by the source conductive coil 704 may be approximately zero at time $t_1$ (as a result of the magnitude of the alternating current driving the source conductive coil 704 at time $t_1$ being approximately zero), in which case the resulting magnetic field $\vec{H}_1$ is substantially equivalent to the magnetic field produced by the source conductive coil 702 at time $t_1$.

Continuing with the example of FIG. 8, at time $t_2$, the phase of the alternative currents driving the source conductive coils 702 and 704 have shifted by approximately 90 degrees. As a result, the magnitude of the magnetic field produced by the source conductive coil 702 has decreased to approximately zero (as a result of the magnitude of the alternating current driving the source conductive coil 702 at time $t_2$ being approximately zero), and the resulting magnetic field $\vec{H}_2$ is substantially equivalent to the magnetic field produced by the source conductive coil 702. In other words, as the magnitude of the magnetic field produced by the source conductive coil 702 decreased to approximately zero from time $t_1$ to time $t_2$, the magnetic field produced by the source conductive coil 704 increased from approximately zero, producing the effect that the direction of the resulting magnetic field $\vec{H}$ rotates from the position of the resulting vector Hi at time $t_1$ to the position of the resulting vector $\vec{H}_2$ at time $t_2$.

At each of times $t_3$, $t_4$, and $t_5$ the phases of the alternating currents driving the source conductive coils 702 and 704 have shifted by a further 90 degrees. As a result, the resulting magnetic field $\vec{H}$ further rotates from the position of the resulting vector $\vec{H}_2$ at time $t_2$ to the position of the resulting vector $\vec{H}_3$ at time $t_3$, to the position of the resulting vector $\vec{H}_4$ at time $t_4$, and to the position of the resulting vector $\vec{H}_5$ at time $t_5$.

In the example of FIG. 8, the alternating currents used to drive the source conductive coils 702 and 704 differ in phase by 90 degrees. Assuming that the planes defined by the source conductive coils 702 and 704 are orthogonal to each other, the direction of the resulting magnetic field vector $\vec{H}$ can rotate linearly (e.g., along a circular trajectory). It should be noted that in other embodiments, the phase difference between the alternating currents used to drive the source conductive coils 702 and 704 can be more or less than 90 degrees, or the angle between the planes defined by the source conductive coils 702 and 704 can be more or less than 90 degrees. In such embodiments, so long as the phase difference between the alternating currents is non-zero, and so long as the planes defined by the source conductive coils 702 and 704 are not co-planar, the direction of the resulting magnetic field vector $\vec{H}$ will rotate, for instance along an elliptical trajectory.

In embodiments where the direction of the resulting magnetic field vector $\vec{H}$ rotates, the strength of inductive coupling between the contact lens and the power source sinusoidally alternates between a strong coupling and a weak coupling. Accordingly, by having the direction of the resulting magnetic field vector $\vec{H}$, the contact lens is able to inductively couple to the power source cyclically, exhibiting a sinusoidal variation similar to a stationary magnetic field amplitude that varies sinusoidally over time. Unlike a stationary magnetic field (which depends on the orientation of the contact lens 120 and the power source), the strength of coupling with a rotating magnetic field is independent of the orientation of the contact lens 120 and the power source. In some embodiments, the contact lens includes a battery or capacitor to smooth out variations in power caused by the rotating magnetic field.

Figure 11:
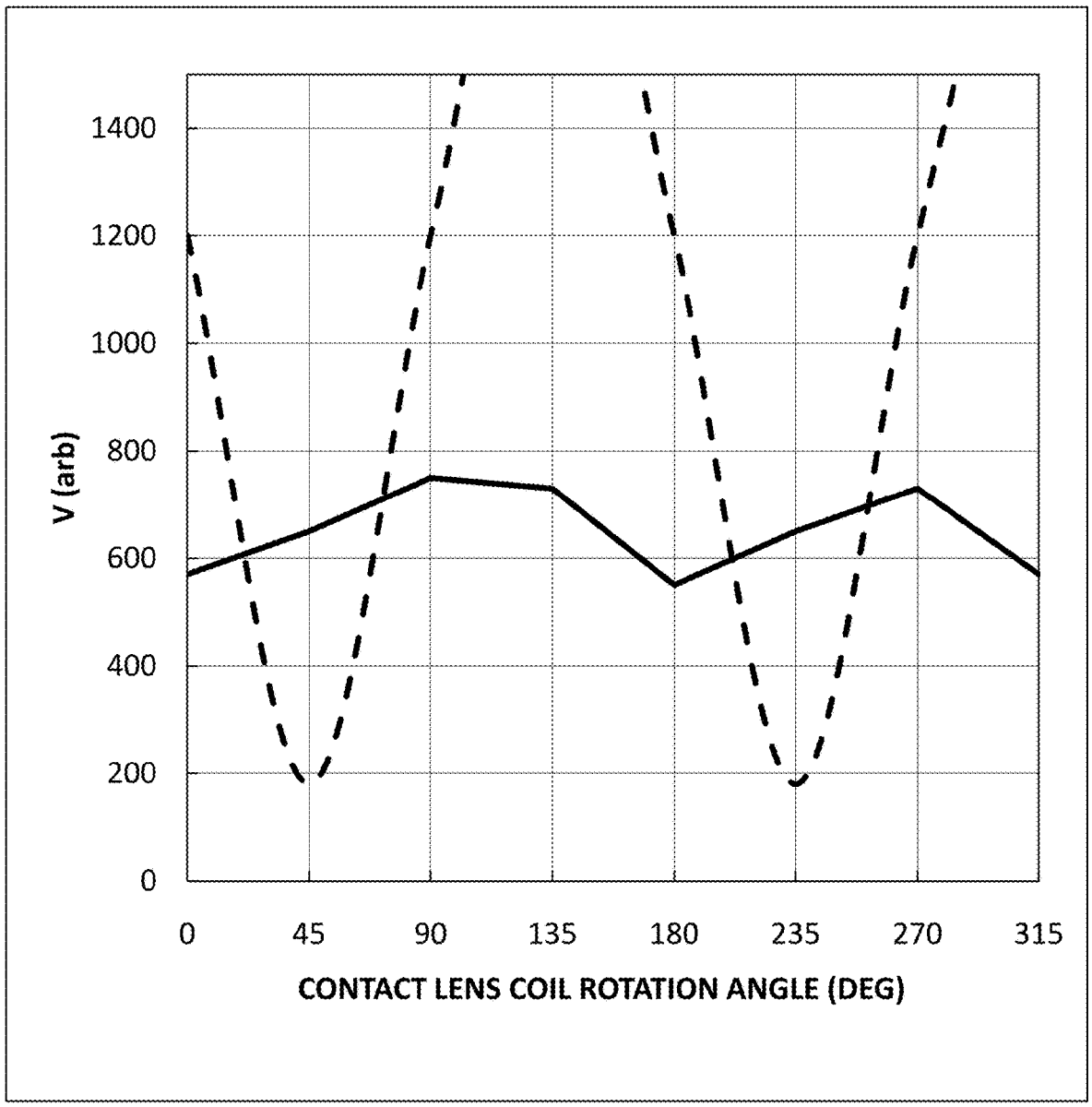
FIG. 11 shows a measured voltage provided to a simulated electronic contact lens at various contact lens orientations in the presence of both a stationary magnetic field and a rotating magnetic field.

FIG. 11 shows a measured voltage provided to a simulated electronic contact lens at various contact lens orientations in the presence of both a stationary magnetic field and a rotating magnetic field. In the example of FIG. 11, the dotted line represents a voltage produced by a contact lens in the presence of a stationary magnetic field as the orientation of the contact lens rotates between zero degrees and 315 degrees. The coupling between the contact lens and the power source producing the stationary magnetic field is weakest when the contact lens is rotated 45 degrees and 235 degrees from an initial orientation, and the contact lens produces a voltage of 200 voltage units at these orientations. As the contact lens rotates from these orientations, the strength of coupling between the contact lens and the power source increases, and likewise, the voltage produced by the contact lens from the stationary magnetic field increases. As used herein, "stationary" refers to a magnetic field that is constant in direction, and not necessarily constant in amplitude or sign.

In the measurement illustrated by FIG. 11, the solid line represents a voltage produced by a contact lens in the presence of a rotating magnetic field as the orientation of the contact lens rotates between zero degrees and 315 degrees. As shown in FIG. 11, the voltage produced by the contact lens in the presence of the rotating magnetic field varies between ~575 voltage units and ~750 voltage units, regardless of the orientation of the contact lens. Thus, in embodiments where the threshold voltage required to power the components of the contact lens varies between 200 voltage units and 575 voltage units, the rotating magnetic field of FIG. 11, unlike the stationary magnetic field, can enable the contact lens to fully operate regardless of the orientation of the contact lens.

Returning to the embodiment of FIG. 7, in some embodiments, the controller 700 can drive the source conductive coils 702 and 704 to produce a rotating magnetic field at the contact lens 120 without having to drive the source conductive coils at the same frequency but with a phase difference. For instance, the resulting magnetic field at the contact lens 120 can be a rotating magnetic field if the controller 700 varies a magnitude of each of the currents used to drive the source conductive coils 702 and 704. For example, the controller 700 can drive the source conductive coil 702 with a first current at a first magnitude and can drive the source conductive coil 704 with a second current at a zero magnitude. The resulting magnetic field at the contact lens 120 will be approximately equal to the magnetic field produced by the source conductive coil 702 (since the source conductive coil 704 doesn't produce a magnetic field without a driving current). The controller 700 can then increase the magnitude of the second current without adjusting the magnitude of the first current, causing the source conductive coil 704 to produce a magnetic field that increases as the magnitude of the second current increases. This causes the direction of the resulting magnetic field at the contact lens 120 to rotate towards the direction of the magnetic field produced by the source conductive coil 704. The controller 700 can then reduce the magnitude of the first current to zero, causing the magnitude of the magnetic field produced by the source conductive coil 702 to reduce to zero, and in turn causing the direction of the resulting magnetic field at the contact lens 120 to further rotate towards the direction of the magnetic field produced by the source conductive coil 704. Accordingly, the controller 700 can continue to adjust the magnitudes of the currents used to drive the source conductive coils 702 and 704, and the resulting magnetic field at the contact lens 120 will continue to rotate. It should be noted the benefits of a rotating magnetic field at the contact lens 120 as described above may apply equally to such embodiments.

It should be noted that the controller 700 can drive the source conductive coils 702 and 704 without necessarily producing a rotating magnetic field at the contact lens 120. For instance, the controller 700 can drive the source conductive coils 702 and 704 using a pre-determined drive current pattern such that the resulting magnetic field alternates in direction between directions that correspond to a most likely orientation range for a contact lens (e.g., such as the orientations illustrated in FIGS. 5A and 5C).

Alternatively, the controller 700 can drive the source conductive coils 702 and 704 based on a feedback signal received from the contact lens. In some embodiments, the feedback signal includes a representation of an orientation of the contact lens 120 or the eye and head of the user wearing the contact lens. For instance, the contact lens 120 can include an orientation or position tracking component, a motion tracking component, accelerometers, gyroscopes, inertial measurement units, and the like (collectively, an "eye orientation component"). A feedback circuit within or associated with the contact lens 120 can transmit a signal representative of the orientation of the eye to the controller 700 (for instance, via a conductive coil of the contact lens configured to operate as a transceiver), and the controller can drive the source conductive coils 702 and 704 based on the representation of the orientation of the eye.

For example, in embodiments in which a signal received from the contact lens indicates that the orientation of the eye has not changed during an interval of time in which the controller 700 drives the source conductive coils 702 and 704 with corresponding driving currents, the controller 700 can continue to drive the source conductive coils 702 and 704 with the same driving currents in order to maintain the same strength of inductive coupling with the contact lens 120. In embodiments in which a signal received from the contact lens indicates that the orientation of the eye has shifted in a direction more parallel to the vector orthogonal to the plane defined by the source conductive coil 704, the controller 700 can increase the magnitude of the current used to drive the source conductive coil 704 to improve the strength of inductive coupling between the contact lens 120 and the source conductive coils. Likewise, in embodiments in which a signal received from the contact lens indicates that the orientation of the eye has shifted in a direction more parallel to the vector orthogonal to the plane defined by the source conductive coil 702, the controller 700 can increase the magnitude of the current used to drive the source conductive coil 702 to improve the strength of inductive coupling between the contact lens 120 and the source conductive coils.

In some embodiments, the controller 700 can access a mapping of eye orientations to source conductive coil drive currents in response to receiving the eye orientation feedback signal. The drive currents mapped to a particular eye orientation can, when applied to corresponding source conductive coils by the controller 700, cause a sufficient resulting magnetic field at the contact lens 120 to be produced for the contact lens to produce enough power to power components of the contact lens. The controller 700 can then query the mapping with the received eye orientation to identify a drive current for each of one or more source conductive coils, and can drive the corresponding source conductive coils with the identified drive currents.

In some embodiments, the controller 700 can drive the source conductive coils 702 and 704 based on a power feedback signal received from the contact lens 120. The power feedback signal can be transmitted by a feedback circuit within or associated with the contact lens 120 based on information provided by a power generation circuit of the contact lens. The power feedback signal can be representative of the amount of power being produced by the contact lens, the amount of current within a reciprocal coil of the contact lens, a strength of inductive coupling between the contact lens and the source conductive coils, an indication that more power is required to power components of the contact lens, and the like. The controller 700 can maintain or alter the amount of current used to drive each source conductive coil 702 and 704 (and thus maintain or adjust the magnetic fields produced by the source conductive coils 702 and 704) based on this representation of the power produced by the contact lens 120.

For instance, in embodiments in which the power feedback signal received from the contact lens 120 indicates that the contact lens, in the presence of the magnetic fields produced by the source conductive coils 702 and 704 in response to driving currents from the controller 700, is producing a sufficient amount of power to power the components of the contact lens, the controller 700 can continue to drive the source conductive coils 702 and 704 without adjusting the driving currents. In these instances, since the resulting magnetic field at the contact lens 120 can be harnessed to address the power needs of the contact lens, there is no need to change the magnetic fields produced by the source conductive coils 702 and 704 (and indeed, a change to a magnetic field produced by a source conductive coil might negatively affect the ability of the contact lens 120 to produce enough power for the components of the contact lens).

In embodiments in which the power feedback signal received from the contact lens 120 indicates that the contact lens is producing less than a threshold amount of power necessary to power components of the contact lens, the controller 700 can adjust the driving current supplied to one or both of the source conductive coils 702 and 704. For instance, the controller 700 can increase the current supplied to one or both of the source conductive coils 702 and 704. In some embodiments, the power feedback signal indicates that the contact lens 120 is producing less than a maximum power, and the controller 700 can adjust the driving current supplied to the source conductive coils until the power feedback signal indicates that the contact lens is producing the maximum power. In other embodiments, the controller 700 can increase the current supplied to a first of the source conductive coils 702 and 704 while decreasing the current supplied to a second of the source conductive coils (for instance, in embodiments where the available amount of current the controller can use to drive the source conductive coils is limited).

In some embodiments, in response to receiving the power feedback signal indicating that the contact lens is not producing enough power, the controller 700 can identify a source conductive coil being driven by the smallest amount of current and can increase the current used to drive the identified source conductive coil. In other embodiments, the controller 700 can iteratively adjust the currents used to drive a first set of source conductive coils, can receive a subsequent power feedback signal, and in response to the subsequent power feedback signal indicating that the contact lens is still not producing a sufficient amount of power, can adjust the currents used to drive a second set of source conductive coils. For example, the controller 700 can 1) increase the current used to drive a first source conductive coil in response to receiving a first power feedback signal indicating that the contact lens 120 is not producing enough power, can 2) decrease the current used to drive the first source conductive coil and/or can increase the current used to drive a second source conductive coil in response to receiving a second subsequent power feedback signal indicating that the contact lens is not producing enough power, can 3) decrease the current used to drive the second source conductive coil and/or can increase the current used to drive a third source conductive coil in response to receiving a third subsequent power feedback signal indicating that the contact lens is not producing enough power, and 4) can iteratively repeat this process by adjusting the drive currents for one or more source conductive coils until a power feedback signal is received that indicates the contact lens is producing a sufficient amount of power.

The contact lens 120 can provide feedback, such as power feedback or eye orientation feedback, to the controller 700 periodically (for instance, every second or less, every 5 seconds, every 10 seconds, every minute, etc.). In other embodiments, the contact lens 120 provides feedback in response to a request from the controller 700, in response to the occurrence of an event (such as an above-threshold change in orientation, an amount of power produced by the contact lens falling below a threshold, and the like), or in response to any other suitable criteria. As noted above, the contact lens 120 can provide feedback using a dedicated feedback circuit, or can use a local transmitter or transceiver, can encode the feedback within magnetic fields produced by a reciprocal coil of the contact lens (e.g., by providing drive currents to the reciprocal coil), or can provide the feedback using any other suitable means available to the contact lens.

It should be noted that the functionalities associated with driving of one or two source conductive coils to produce a resulting magnetic field at a contact lens 120 as described herein also apply to the driving of three or more coils. For instance, FIG. 9A shows a side view of a system with three conductive coils for providing power to an electronic contact lens and FIG. 9B shows a front view of a system with three conductive coils for providing power to an electronic contact lens.

Figure 9A:
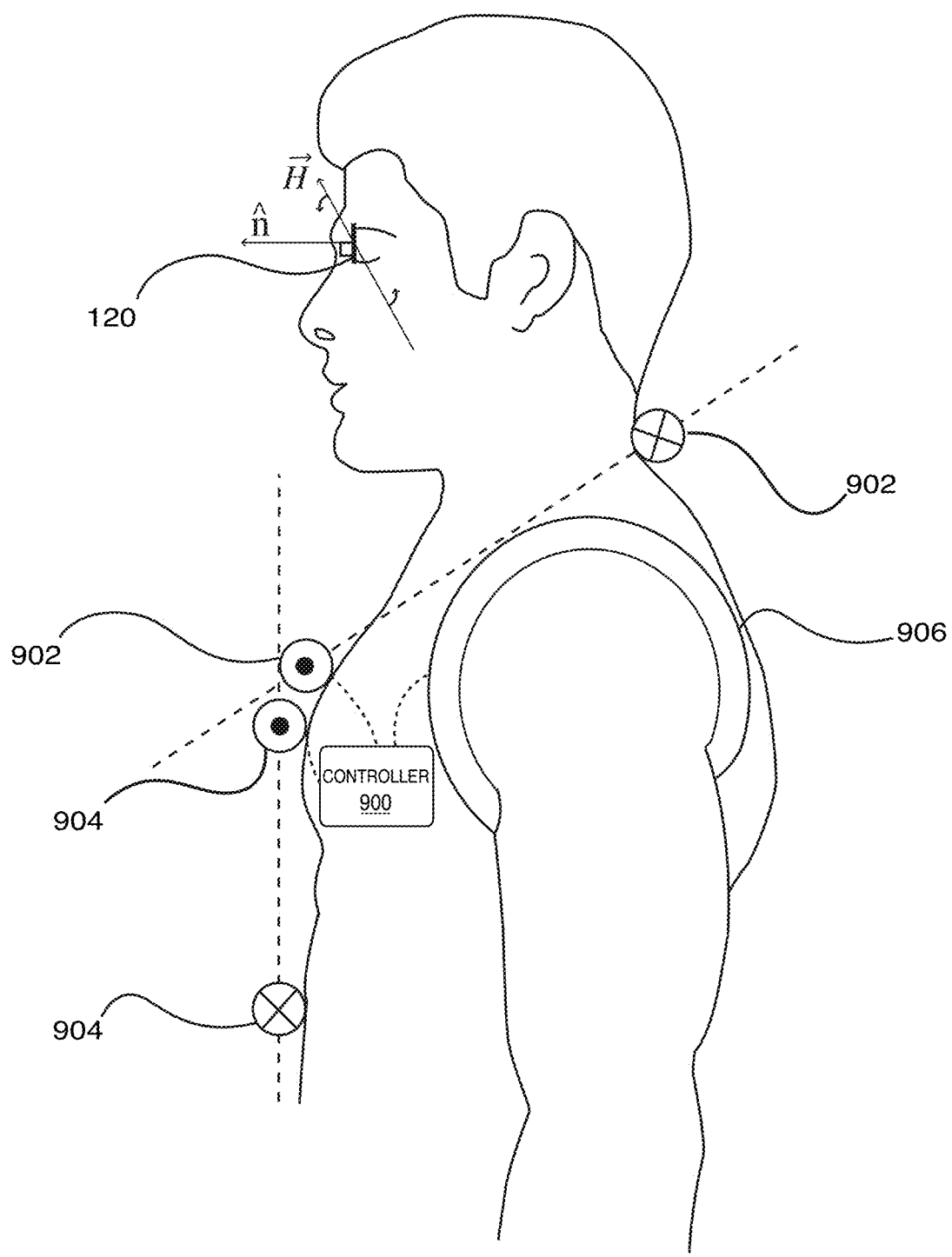
FIG. 9A shows a side view of a system with three conductive coils for providing power to an electronic contact lens.
Figure 9B:
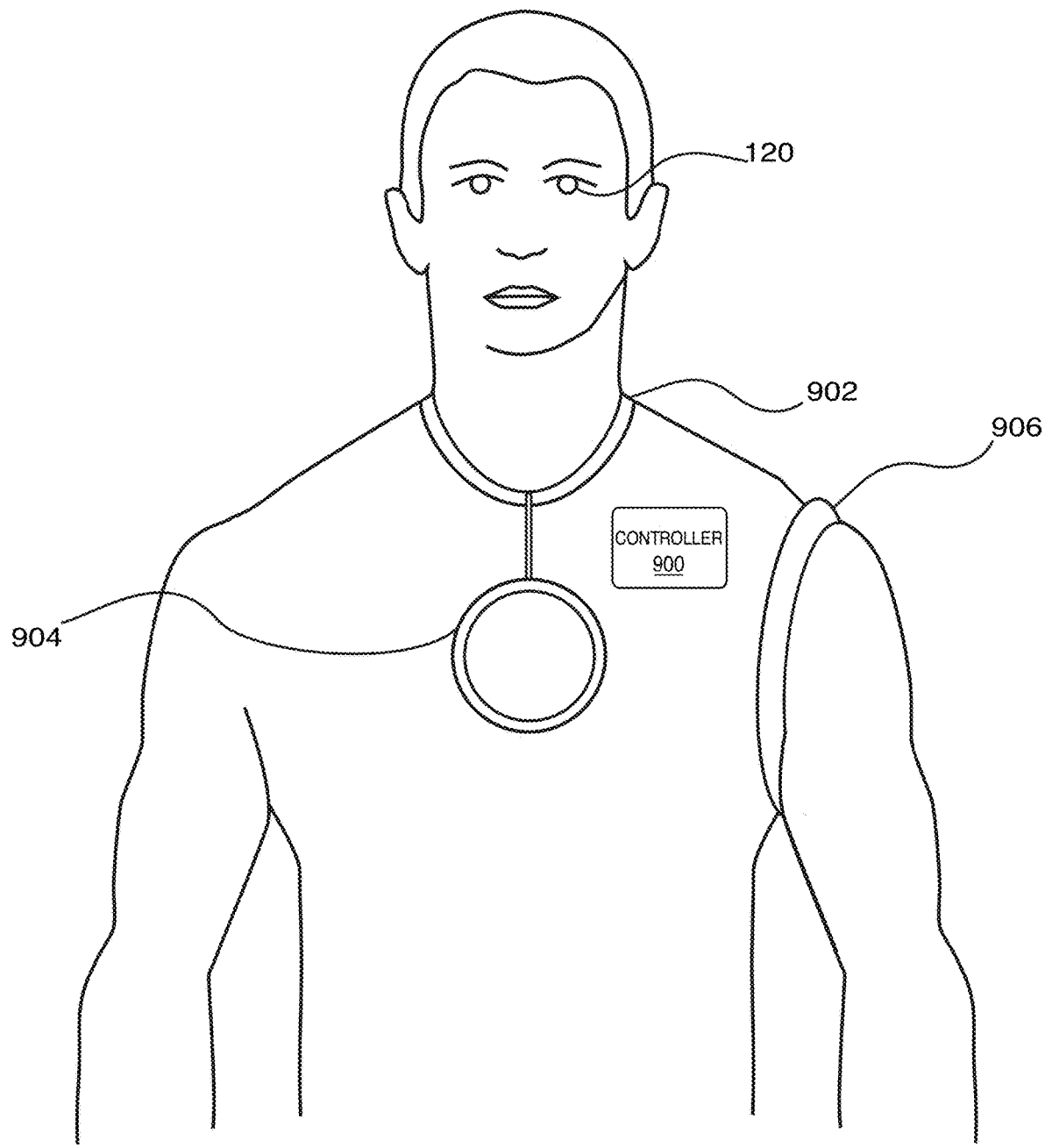
FIG. 9B shows a front view of a system with three conductive coils for providing power to an electronic contact lens.

In the embodiments of FIGS. 9A and 9B, a controller 900 drives three source conductive coils 902, 904, and 906. The source conductive coils 902, 904, and 906 as illustrated in FIGS. 9A and 9B are worn around a user's neck, on a user's chest, and around a user's shoulder, respectively. In this arrangement of source conductive coils, the three vectors orthogonal to each of the planes defined by the source conductive coils are orthogonal to each other. Such an arrangement of source conductive coils enables the source conductive coils to be driven in such a way to produce a resulting magnetic field at the contact lens 120 in any desired direction.

In some embodiments, the controller 900 can drive the source conductive coils 902, 904, and 906 with currents at a same frequency but with a phase difference between the currents. In such embodiments, the direction of the resulting magnetic field at the contact lens 120 will rotate in some repeating pattern in three dimensions, enabling the contact lens 120 to strongly inductively couple to the source conductive coils 902, 904, and 906 for at least some portion of the current frequency cycle independent at any orientation of the contact lens. As noted above, the source conductive coils 902, 904, and 906 can instead be driven by varying the magnitudes of the currents provided to the source conductive coils in order to produce a resulting magnetic field that rotates in three dimensions. Finally, as described above, the source conductive coils 902, 904, and 906 can also be driven by the controller 900 based on a pre-determined drive current pattern or based on power feedback or eye orientation information received from the contact lens 120 in order to produce a resulting magnetic field at the contact lens sufficient for the contact lens to produce enough power to power the components of the contact lens.

Figure 10A:
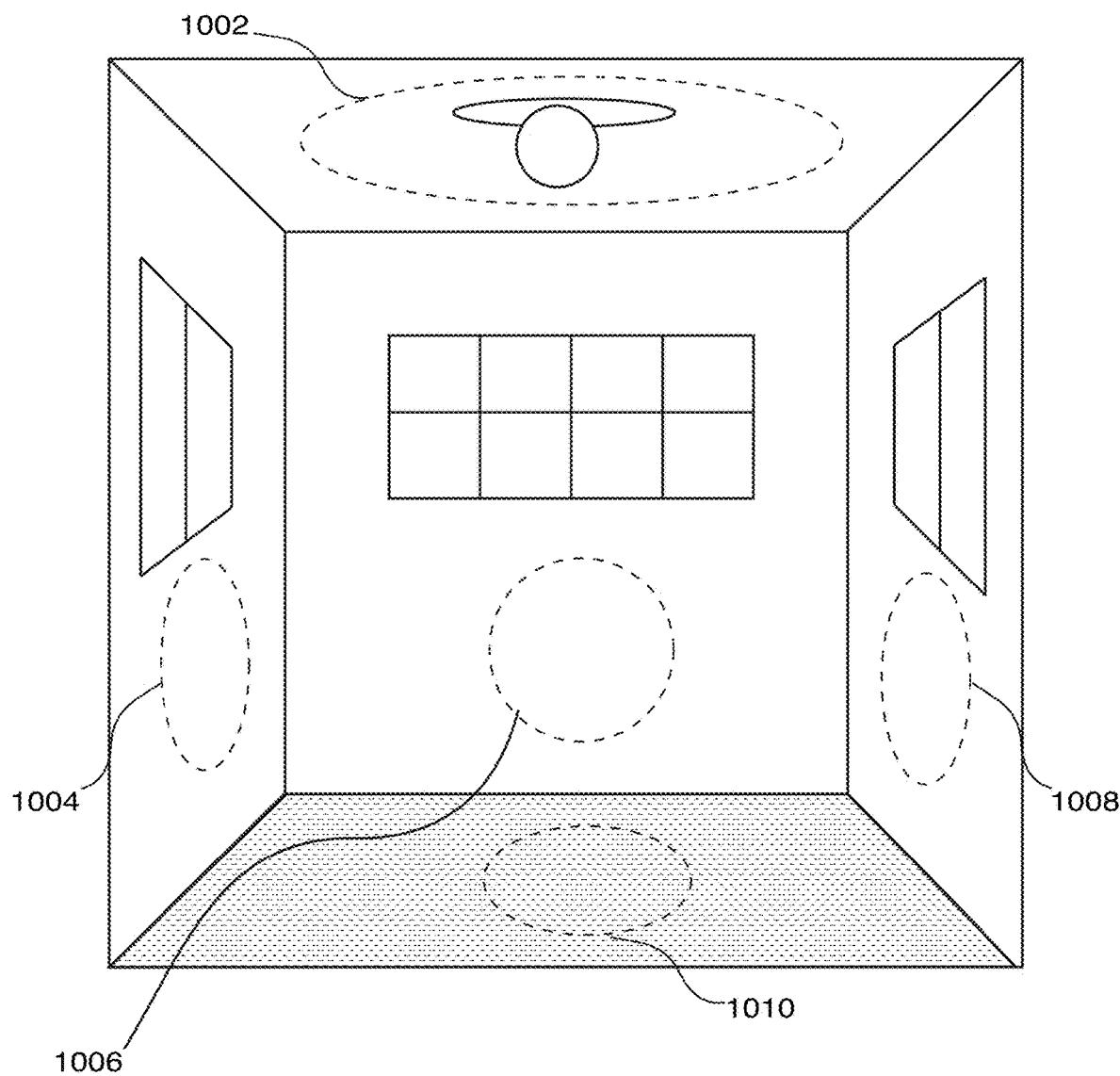
FIGS. 10A and 10B show rooms with multiple conductive coils for providing power to an electronic contact lens.
Figure 10B:
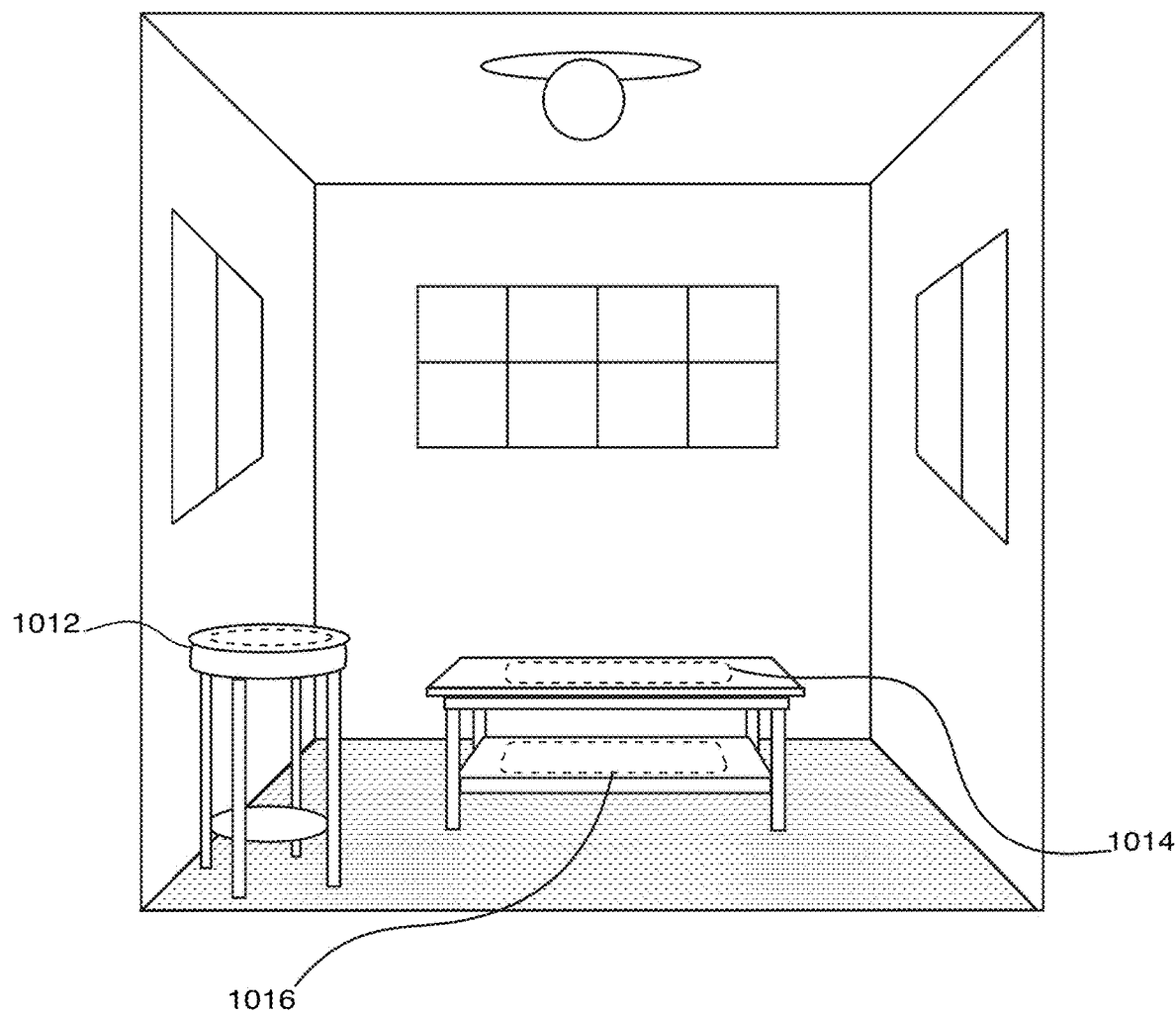
Figure 10C:
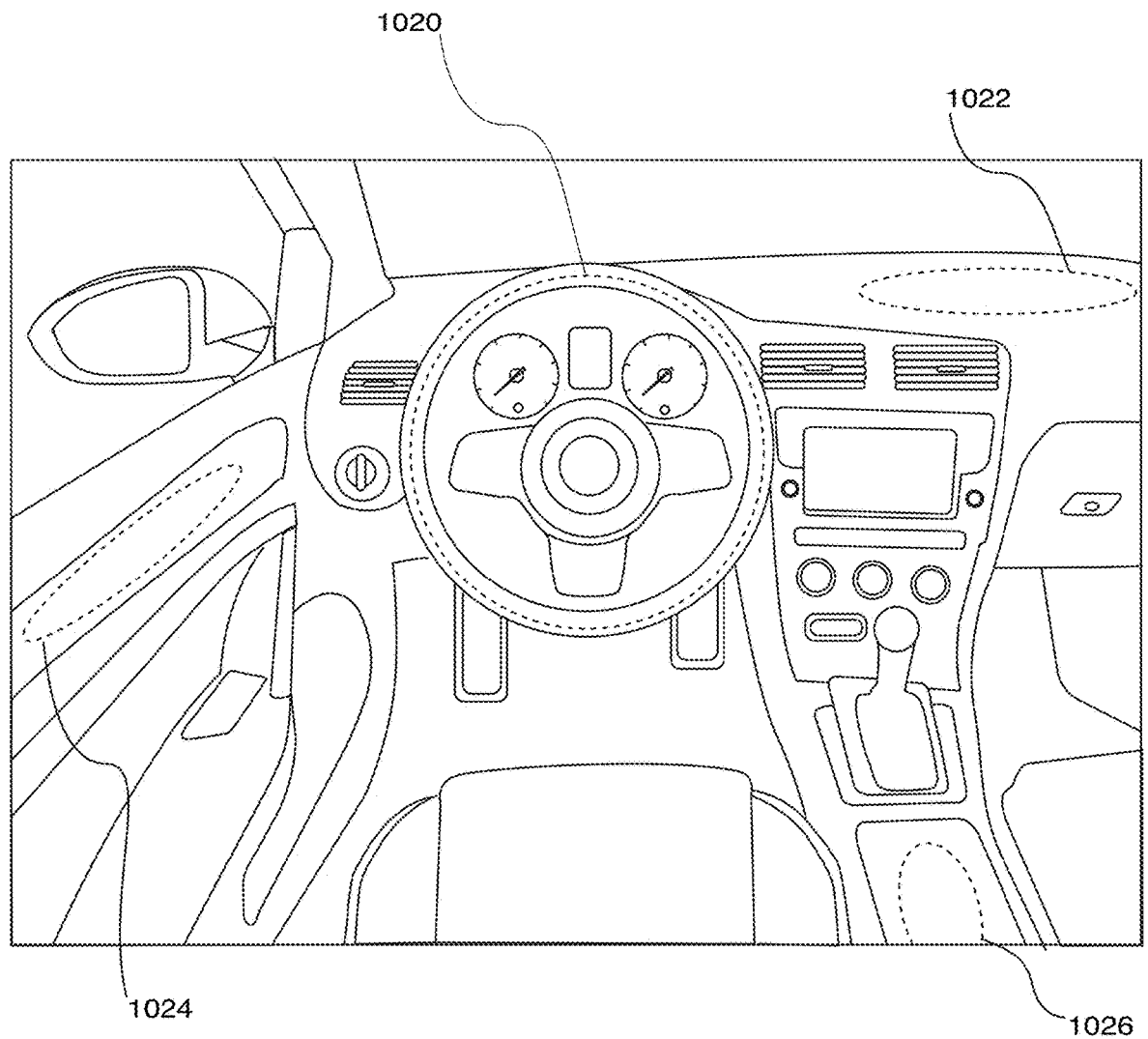
FIG. 10C shows an interior of a car with multiple conductive coils for providing power to an electronic contact lens.

Although many of the embodiments described above are described in terms of wearable source conductive coils, in practice, the source conductive coils can be located within an environment of a wearer of the contact lens 120 and still perform the functionalities as described here. For instance, FIGS. 10A and 10B show rooms with multiple source conductive coils for providing power to an electronic contact lens. In FIG. 10A, a source conductive coil is located on each wall of the room of FIG. 10A. For instance, the source conductive coil 1002 is located on the ceiling of the room, source conductive coils 1004, 1006, and 1008 are located on the side and front walls of the room, and source conductive coil 1010 is located on the floor. In FIG. 10B, a source conductive coil is located on surfaces of objects within the room. For instance, source conductive coil 1012 is located on a top surface of a side table, source conductive coil 1014 is located on an upper surface of a coffee table, and source conductive coil 1016 is located on a lower surface of the coffee table. The source conductive coils can also be located on various surfaces within an automobile. FIG. 10C shows an interior of a car with multiple source conductive coils for providing power to an electronic contact lens. For instance, source conductive coil 1020 is located around a steering wheel, source conductive coil 1022 is located on a front dashboard of the car, source conductive coil 1024 is located on a door of the car, and source conductive coil 1026 is located on a center console of the car.

In the embodiments of FIGS. 10A, 10B, and 10C, one or more of the source conductive coils within the environment of a wearer of a contact lens can produce magnetic fields for power conversion by the contact lens. As described above, a resulting rotating magnetic field can be produced by driving two or more of the coils with currents at a same frequency but with a different phase, or by adjusting the amplitudes of the currents over time. Likewise, the contact lens can provide feedback to the source conductive coils within these environments, for instance power feedback and eye orientation feedback. In response to and based on this feedback, the source conductive coils can be driven with different currents, or one or more different source conductive coils can be driven to produce magnetic fields. By locating the source conductive coils within an environment of a wearer of a contact lens, the source conductive coils can access an external power source, and may not be limited to a portable/wearable power source as are many of the embodiments of the source conductive coils described above.

The augmented reality system 100 may include multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

What is claimed is:

1. A system comprising:
a plurality of wearable transmitter conductive coils each configured to be worn in a stationary position on a user's body and further configured to generate a corresponding time varying magnetic field;
an electronic contact lens comprising one or more receiver conductive coils and a femtoprojector configured to project images onto a retina of the user's eye, the one or more receiver conductive coils configured to receive power from a resulting time-varying magnetic field that results from a collective effect of the time varying magnetic fields generated by the transmitter conductive coils; and
a controller configured to drive the plurality of wearable transmitter conductive coils such that a direction of the resulting time-varying magnetic field at the electronic contact lens rotates through 360 degrees over time as a result of the collective effect of the time varying magnetic fields generated by the transmitter conductive coils.

2. The system of claim 1, wherein the controller drives a different AC signal to each of the plurality of wearable transmitter conductive coils, two or more of the AC signals have a same frequency but different phases, and the direction of the resulting time-varying magnetic field at the electronic contact lens rotates through 360 degrees over time as a result of the different phrases.

3. The system of claim 1, wherein the controller drives a different AC signal to each of the transmitter conductive coils, two or more of the AC signals have a same frequency but different maximum magnitudes that vary periodically relative to one another, and the direction of the resulting time-varying magnetic field at the electronic contact lens rotates through 360 degrees over time as a result of the periodic variation of the maximum magnitudes.

4. The system of claim 1, wherein the plurality of wearable transmitter conductive coils includes a first transmitter conductive coil and a second transmitter conductive coil, the first transmitter conductive coil configured to produce a first magnetic field in a first direction at the electronic contact lens, and the second transmitter conductive coil configured to produce a second magnetic field in a second direction different than the first direction when the first transmitter conductive coil is worn on the body in a first orientation and the second transmitter conductive coil is worn on the body in a second orientation different than the first orientation.

5. The system of claim 4, wherein the first transmitter conductive coil is configured to be worn around a neck of a person and the second transmitter conductive coil is configured to be worn on a chest of the person.

6. The system of claim 4, wherein the first transmitter conductive coil and the second transmitter conductive coil are not co-planar.

7. The system of claim 4, wherein the plurality of wearable transmitter conductive coils includes a third transmitter conductive coil, wherein the third transmitter conductive coil is configured to produce a third magnetic field in a third direction at the electronic contact lens different than the first direction and the second direction when the third transmitter conductive coil is worn in a third orientation different than the first orientation and the second orientation, and wherein the third direction is not coplanar with a plane defined by the first direction and the second direction.

8. The system of claim 7, wherein the first wearable transmitter conductive coil is configured to be worn around a neck of a person, the second wearable transmitter conductive coil is configured to be worn on a chest of the person, and the third wearable transmitter conductive coil is configured to be worn around a shoulder of the person.

9. The system of claim 1, wherein the electronic contact lens comprises a power circuit configured to produce power from the power received by the one or more receiver conductive coils from the resulting time-varying magnetic field.

10. A method for providing power to an electronic contact lens configured to project images onto a retina of a user's eye, comprising:
- driving, by a controller, a first wearable transmitter conductive coil worn in a first stationary position on a user's body to produce a first time-varying magnetic field;
- driving, by the controller, a second wearable transmitter conductive coil worn in a second stationary position on the user's body to produce a second time-varying magnetic field, wherein the first and the second magnetic fields collectively create a resulting time-varying magnetic field, and a direction of the resulting time-varying magnetic field at the electronic contact lens rotates through 360 degrees over time; and
- receiving, by one or more receiver conductive coils embedded in the electronic contact lens, power from the resulting time-varying magnetic field.

11. The method of claim 10, wherein the controller drives a different AC signal to each of the first wearable transmitter conductive coil and the second wearable transmitter conductive coil, the AC signals having same a frequency but different phases, and the direction of the resulting time-varying magnetic field at the electronic contact lens rotates through 360 degrees over time as a result of the different phrases.

12. The method of claim 10, wherein the first wearable transmitter conductive coil is configured to produce the first time-varying magnetic field in a first direction at the electronic contact lens, and the second wearable transmitter conductive coil is configured to produce the second time-varying magnetic field in a second direction at the electronic contact lens different than the first direction when the first transmitter conductive coil is worn on the body in a first orientation and the second transmitter conductive coil is worn on the body in a second orientation different than the first orientation.

13. The method of claim 10, further comprising:
- driving, by the controller, a third wearable transmitter conductive coil to produce a third magnetic field in a third direction at the electronic contact lens, wherein the direction of the resulting time-varying magnetic field at the electronic contact lens rotates in three dimensions.

14. The method of claim 10, wherein the electronic contact lens comprises a power circuit configured to produce power in response to the resulting time-varying magnetic field.

15. The system of claim 4, wherein the first direction and the second direction are perpendicular at the electronic contact lens.

16. The system of claim 15, wherein the first magnetic field and the second magnetic field are 90 degrees out of phase.

17. The system of claim 4, wherein the first transmitter conductive coil and the second transmitter conductive coil are not collocated when worn on the body.

18. The method of claim 12, wherein the first direction and the second direction are perpendicular at the electronic contact lens.

19. The method of claim 18, wherein the first magnetic field and the second magnetic field are 90 degrees out of phase.

20. The method of claim 12, wherein the first transmitter conductive coil and the second transmitter conductive coil are not collocated when worn on the body.

* * * * *